US009890690B2

(12) United States Patent
Chiera et al.

(10) Patent No.: US 9,890,690 B2
(45) Date of Patent: Feb. 13, 2018

(54) PASSIVE PRECHAMBER DIRECT INJECTION COMBUSTION

(71) Applicant: Woodward, Inc., Fort Collins, CO (US)

(72) Inventors: Domenico Chiera, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/288,734

(22) Filed: Oct. 7, 2016

(65) Prior Publication Data
US 2017/0096932 A1    Apr. 6, 2017

Related U.S. Application Data

(63) Continuation of application No. PCT/US2016/055813, filed on Oct. 6, 2016.
(Continued)

(51) Int. Cl.
*F02B 19/18*    (2006.01)
*F02B 19/12*    (2006.01)
(Continued)

(52) U.S. Cl.
CPC .............. *F02B 19/18* (2013.01); *F02B 19/12* (2013.01); *F02B 43/00* (2013.01);
(Continued)

(58) Field of Classification Search
CPC .......... F02B 19/08; F02B 19/18; F02B 19/12; F02B 43/00; F02P 15/006; F02P 5/152;
(Continued)

(56) References Cited

U.S. PATENT DOCUMENTS 5,947,076 A *   9/1999   Srinivasan .............. F02B 19/12
                                                    123/256
8,839,762 B1    9/2014   Chiera et al.
(Continued)

FOREIGN PATENT DOCUMENTS

DE          3709976 A1    10/1988
DE     102012021842 A1     5/2014
(Continued)

OTHER PUBLICATIONS

International Search Report and Written Opinion issued in International Application No. PCT/US2016/055813 dated Jan. 9, 2017; 12 pages.
(Continued)

*Primary Examiner* — Hieu T Vo
(74) *Attorney, Agent, or Firm* — Fish & Richardson P.C.

(57) ABSTRACT

An injector-igniter assembly includes a passive prechamber and a fuel injector. In an internal combustion engine, fuel is directly injected into a combustion chamber to mix with air in the combustion chamber. Embodiments enable filing the prechamber at different air-fuel-ratio than the main chamber without directly filling the prechamber with fuel. The prechamber has jet apertures in fluid communication with the combustion chamber. In operation, fuel is injected directly into the combustion chamber though nozzles to form a cloud adjacent to openings into the prechamber. Subsequently, mixed fuel and air is ingested into the prechamber from the combustion chamber and ignited. The degree of mixing prior to ingestion into the prechamber can be controlled using different nozzles configurations. Ignited gaseous fuel and air is expelled from the prechamber through the jet apertures and into the combustion chamber as a flaming jet with a core of gaseous fuel.

20 Claims, 17 Drawing Sheets

Related U.S. Application Data

(60) Provisional application No. 62/238,013, filed on Oct. 6, 2015.

(51) Int. Cl.
*F02P 13/00* (2006.01)
*F02M 21/02* (2006.01)
*F02B 43/00* (2006.01)
*F02M 61/18* (2006.01)
*F02P 5/152* (2006.01)
*F02P 15/00* (2006.01)
*F02M 57/06* (2006.01)

(52) U.S. Cl.
CPC ......... *F02M 21/0275* (2013.01); *F02P 13/00* (2013.01); *F02M 57/06* (2013.01); *F02M 61/1813* (2013.01); *F02P 5/152* (2013.01); *F02P 15/006* (2013.01)

(58) Field of Classification Search
CPC ..... F02P 13/00; F02M 21/02; F02M 21/0275; F02M 57/06; F02M 61/1823
See application file for complete search history.

(56) References Cited

U.S. PATENT DOCUMENTS

| | | |
|---|---|---|
| 9,172,217 B2 | 10/2015 | Hampson et al. |
| 2012/0090572 A1 | 4/2012 | Baxter |
| 2014/0196686 A1 | 7/2014 | Coldren |
| 2017/0101922 A1* | 4/2017 | Loetz ..................... F02B 19/08 |

FOREIGN PATENT DOCUMENTS

| | | | |
|---|---|---|---|
| DE | 102015206074 A1 * | 10/2016 | ......... F02M 21/0272 |
| FR | 2763642 A1 | 11/1998 | |
| WO | WO 2016057557 A1 * | 4/2016 | ............. F02B 19/12 |

OTHER PUBLICATIONS

Hampson et al., "Prechamber Spark Plug with Circular Disk Electrode and Method of Manufacturing Same," U.S. Appl. No. 61/416,588, filed Nov. 23, 2010, 24 pages.

* cited by examiner

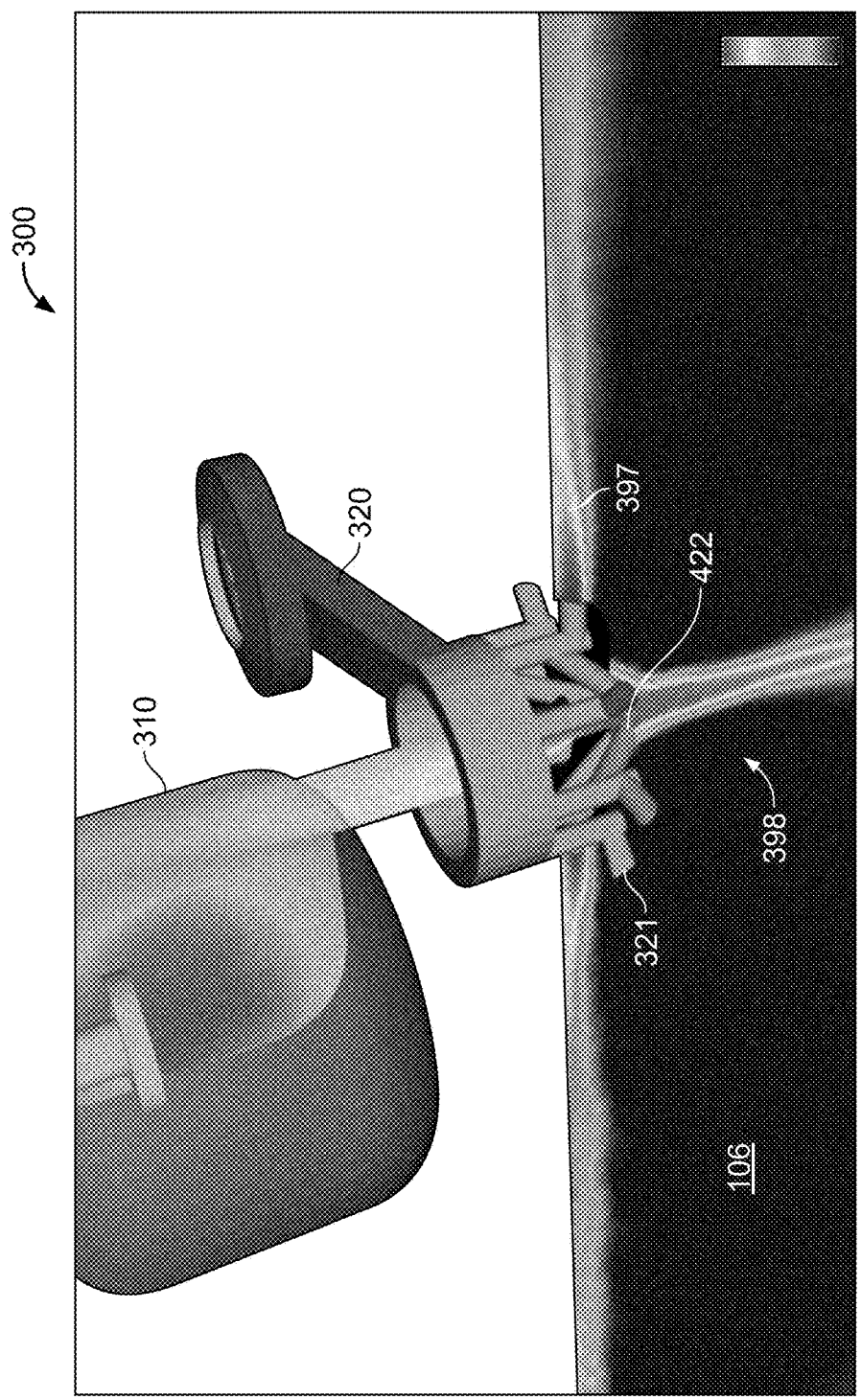

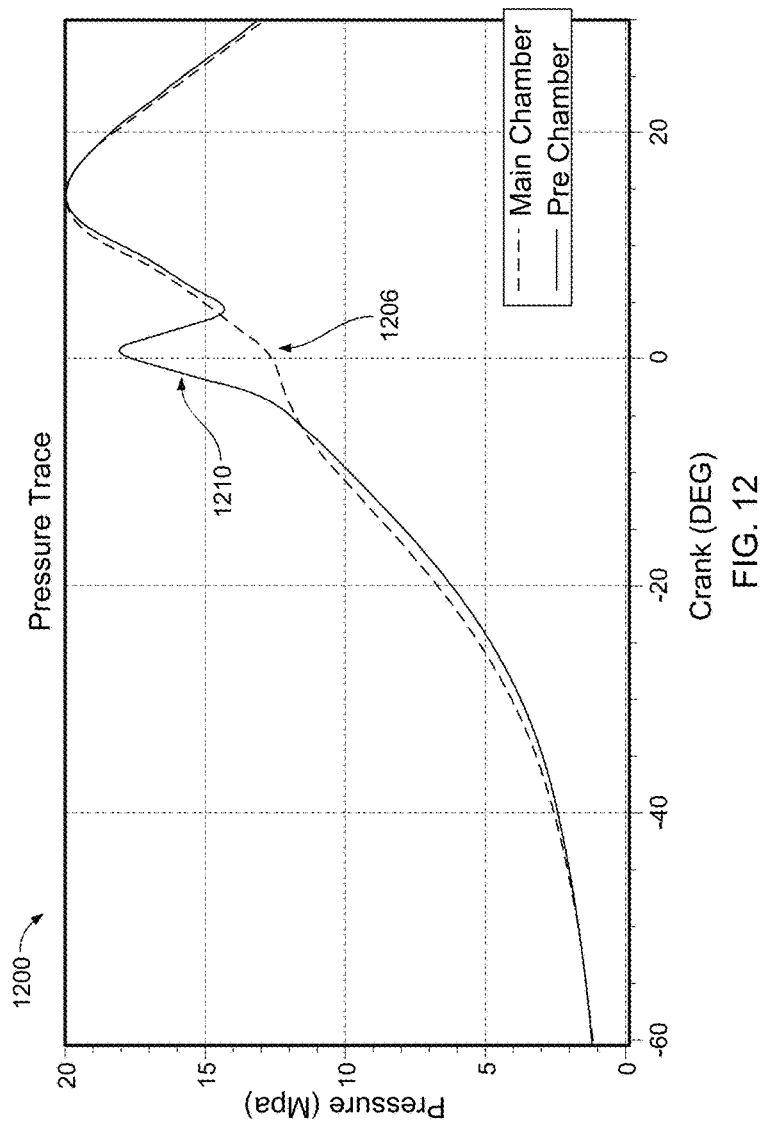

US 9,890,690 B2

PASSIVE PRECHAMBER DIRECT INJECTION COMBUSTION

CLAIM OF PRIORITY

This application is a continuation of and claims the benefit of priority to International Patent Application No. PCT/US2016/055813, filed on Oct. 6, 2016, which claims the benefit of priority to U.S. Provisional Patent Application No. 62/238,013, filed on Oct. 6, 2015, the entire contents of which are hereby incorporated by reference.

BACKGROUND

The concepts herein relate to gaseous fuel combustion for internal combustion engines.

There is a push to utilize natural gas as an engine fuel due to its low cost. Relative to diesel fuel, for instance, natural gas is a lower cost fuel per energy. Natural gas is typically ignited with a spark plug. However, the ignition energy from the spark plug does not always effectively ignite the natural gas at high compression ratios, particularly at lean operating conditions. To remedy this, some systems forgo a spark plug and use diesel fuel as a pilot fuel. In other words, these systems inject a small amount of diesel fuel as a pilot fuel early in the compression cycle that auto-ignites from the compression. Natural gas is then by injected and ignited by the combusting pilot fuel. However, a natural gas system using diesel as a pilot fuel requires two fuel systems and associated piping, storage, injectors, etc., which can increase cost, size, complexity and makes retrofitting difficult.

Compression ignition (e.g. Diesel) engines are known to be the standard for efficiency—due to high compression ratio, induction and compression of air rather than fuel and air, no throttle and high brake mean effective cylinder pressure (i.e., "BMEP"). However, the fuel in a typical diesel engine burns in a diffusion flame—having a fuel rich core injected into air. The flame front is at the stoichiometric interface between fuel and air and the rate of combustion is controlled by the rate that oxygen diffuses into the reaction and burned products diffuse out of the reaction zone. This non-homogeneous combustion leads to (a) high emissions of NOx and soot and (b) slower burning and thus less efficient overall combustion phasing, since significant fraction of the combustion occurs as the piston is expanding, so that each gram of fuel that burns after the crank top dead center will enjoy a lower and lower expansion ratio and thus lower work extraction.

Alternatively, spark ignition combustion of gaseous fuels within an Otto Cycle (near constant volume combustion) has highly efficient combustion and good combustion phasing for efficiency, however due to the auto-ignition process inherent in premixed air-fuel mixtures—to control detonation and knock the compression ratio must be lower; a throttle is used to control load; and the fresh charge of air plus fuel is the compression working fluid. However, when operated at controlled stoichiometric air-fuel ratio (i.e., AFR), a low-cost three-way catalysis is very effective in reducing emissions to regulated levels without much complexity.

BRIEF DESCRIPTION OF THE FIGURES

FIG. 4 an illustration of the example prechamber and injector assembly of FIG. 3, showing convergent fuel nozzles.

FIG. 12 is a graph of pressure in the prechamber and the main combustion chamber of FIGS. 11A and 11B during the combustion event.

DETAILED DESCRIPTION

Figure 1:
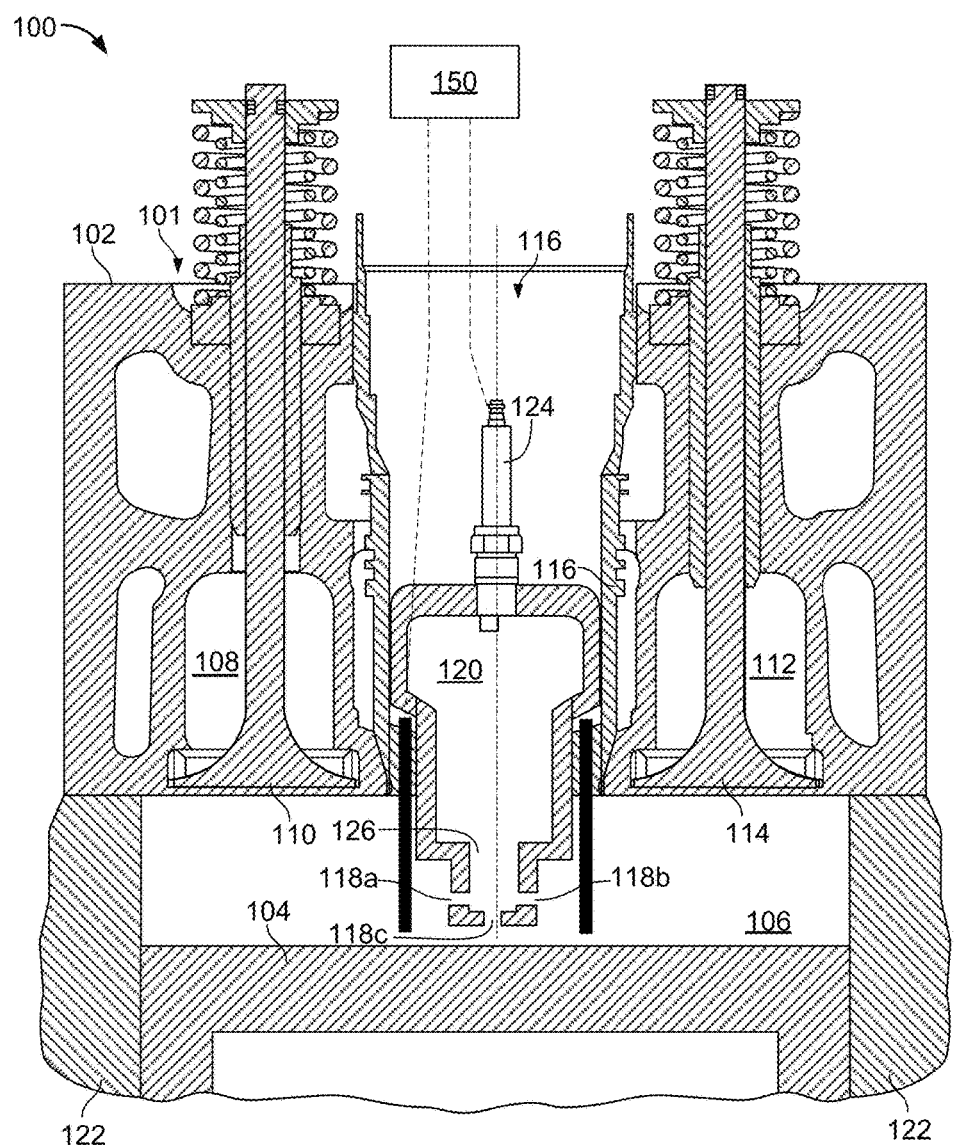
FIG. 1 is a cross-section of a portion of an example internal combustion engine system.

An ideal engine cycle would combine the best of both natural gas and diesel engine and combustion strategies. For example, it can be advantageous to have a high compression ratio for good efficiency in combination with a system that inducts air into the main combustion chamber (instead of an air-fuel mixture), while optimizing emission by using a stoichiometric air-fuel-ratio (AFR). It is also desirable to have fast combustion occurring near the top-dead-center position of the piston. Designing a system that implements the above strategies presents specific challenges. First, the system needs a high compression ratio engine without auto-ignition and knock risk with little or limited exhaust gas recirculation (i.e., for stoichiometric AFR) or excess air (i.e., preventing lean burn). Second, the system should induct air to improve volumetric efficiency, and therefore should rapidly mix air and fuel in-cylinder to enable fast combustion with low emissions. Some example systems and methods described herein address the above goals and strategies.

One specific challenge is operating an engine at a high compression ratio while preventing engine knock. Engine knock refers to the auto-ignition of mixture gaseous fuel and air "ahead of the flame front". Given sufficient time, temperature and pressure, a portion of the "end gas", undergoes compression during the compression stroke, but also as a result of the pressure rise cause by the combustion process which starts at the ignition source. This "end gas" is not ignited by the propagating flame itself, but rather by the pressure and temperature rise resulting from the combustion as the flame travels across the combustion chamber. The process of combustion raises the pressure and temperature in the entire combustion chamber and thus for the unburned mixture "ahead of the flame". To this end gas, it appears as if the engine compression process is just continuing. The compression heating from the piston movement reducing volume plus the pressure rise of the combustion cause auto-ignition reactions to build and "self-heat" until a zone is ripe for auto-ignition. If the flame gets to it first, the flame will consume the "ready to knock" mixture, but, if not, the zone will auto-ignite on its own. When the zone auto-ignites, the energy of the zone is released quickly—sending a shock wave across the combustion chamber, which has two detrimental effects: First, the auto-ignition will cause other zones "near to auto ignite" to feel the pressure pulse and be trigged to also auto-ignite (chain reaction). And, second, the auto-ignition will increase heat transfer by destruction of the protective boundary layer. If sustained, knock will lead to excessive heating in the combustion chamber, which usually results in engine damage (e.g., burn holes or expansion of the piston to point of seizure). Therefore, knock must be avoided for engines to last. Typically, engines will deploy one or more of the following to address knock: (a) retarded spark timing (i.e., a later start of combustion), (b) lower compression ratio, (c) high dilution with EGR or lean mixture, or (d) run at very high speeds to reduced available time, BMEP and temperatures. In medium speed, high BMEP engines, (a), (b) and (c) are used.

Disclosed is an injector-igniter assembly including a parallel passive prechamber and a fuel injector. In an internal combustion engine, fuel is directly injected into a combustion chamber to mix with air in the combustion chamber. Embodiments enable filing the prechamber at different air-fuel-ratio than chamber without directly filling the prechamber with fuel. The prechamber has jet apertures in fluid communication with the combustion chamber. In operation, fuel is injected directly into the combustion chamber though nozzles to form a cloud adjacent to openings into the prechamber. Subsequently, mixed fuel and air is ingested into the prechamber from the combustion chamber and ignited. The degree of mixing prior to ingestion into the prechamber can be controlled using different nozzles configurations. Ignited gaseous fuel and air is expelled from the prechamber through the jet apertures and into the combustion chamber as a flaming jet with a core of gaseous fuel.

Some examples of the present system include a method to retain the benefits of the high compression ratio typical of compression-ignition (CI) engines combined with the fast combustion of the spark-ignition (SI) Otto cycle, while suppressing knock. Additional benefits come from inducting and compressing air absent of fuel.

Some aspects of the disclosure include and encompass a medium pressure direct gaseous injection system using an injector with integral igniter and a passive prechamber (passive, refereeing to fuel not being injected directly into the prechamber as is typical of "scavenged prechambers") and by precise control of injection timing to achieve a late injection start followed by later start of combustion while still achieving fast combustion. In some aspects, the aforementioned auto-ignition reactions (which limit achieving high BMEP and high compression ratio) are delayed by (a) not introducing the fuel directly into the inducted air charge, and by (b) delaying the injection of fuel which delays the start time of the auto-ignition reactions. In general, if there is no fuel in the end gas, then the auto-ignition reactions cannot begin. In some instances, delay of fuel introduction delays the onset of knock and pushes the time out past the critical time, such that the knock is no longer of sufficient magnitude to be a problem or is essentially not present.

In the concepts herein, the fuel is injected directly into the combustion chamber. Direct injection is used to (a) control engine load and (b) to avoid pre-ignition of the fuel—as the compression ignition process cannot start until the fuel is injected. This direct injection enables the engine to run with high compression ratio, and thus improved efficiency.

Injecting the gas directly in the combustion chamber, sometime after intake valve closure and before top dead center, enables optimizing for mixing, stratifying the charge so that there is less gas in the end gas region and reduce the time for the gas in the end gas region to undergo the auto-ignition reactions. Thus this system can retain high compression ratio for high efficiency but remove the knock limitations by controlling the distribution and compression time for the end gas region.

Late combustion avoids the increase of pressure and temperature normally resulting from compression of the combustion products during the compression stroke. Owing to the fast burn rate, combustion can start after top dead center and still end up with an optimal location of the center of heat release (e.g., CA50—the crank angle at 50% heat release). This is possible due to jet acceleration due to the combusting flame jets produced using the passive prechamber.

The prechamber is a passive prechamber, or perhaps it could be referred to as a semi-passive prechamber, because—unlike a classical fuel fed prechamber (aka Scavenged Prechamber)—the fuel is not directly injected into the prechamber, but parallel to and adjacent the prechamber. The fuel primarily enters the main combustion chamber where it partially mixes with air before being ingested into the prechamber. This permits controlling the amount of fuel in the prechamber independent of the main chamber fueling. In some instances, fuel is injected at top dead center without over enriching the prechamber.

Relative to a classic fuel fed prechamber—where the ignition fuel is injected into the prechamber, the spark plug is in the same prechamber, and the fuel for the main combustion chamber does not go thru the prechamber, in system herein, the fuel is not injected directly into the prechamber but via a parallel channel, but directing fuel to the main combustion chamber (not directly to the prechamber). In certain instances, the fuel injector can be integrated with the prechamber in the same device. Alternatively, the injector can employ "parallel" fueling, where while the main injection path is directed into the main combustion chamber, an adjustable bleed hole enables a leakage pathway into the prechamber to provide some direct fueling of the prechamber while the main chamber is being fuelled simultaneously. The ratio of leakage into the prechamber relative to to main chamber fueling can be optimized.

Relative to systems having a fuel-fed prechamber—where the fuel injection port and the spark plug are in the prechamber, and the total fuel for the main combustion chamber is not injected thru the prechamber—the system herein is responsible for the total fuel delivery to the main combustion chamber but the fuel line is parallel to the prechamber—not directly plumbed into the prechamber.

FIG. 1 shows a cross-section of a portion of an example internal combustion engine system 100. The example engine system 100 includes an internal combustion engine 101 that is a reciprocating engine and includes a head 102, a block 122, and a piston 104. The piston 104 is located inside a cylinder defined inside the block 122. The piston 104 is carried to reciprocate inside the cylinder during engine operation and its movement drives a crank (not shown) and movement of the crank drives the piston 104. A main combustion chamber 106 is a volume located inside the cylinder between the head 102 and the piston 104, and is bounded by the block 122. FIG. 1 is a cross-section of one piston 104 in a cylinder. The engine 101, however, can include one, two or more similar pistons 104 in a cylinder coupled to the crank.

The example internal combustion engine 101 includes an air intake passage 108 with intake valve 110 and an exhaust passage 112 with exhaust valve 114. The passages 108, 112 are in the head 102 adjacent to the main combustion chamber 106, and the valves 110, 114 form part of the walls of the main combustion chamber 106. The intake valve 110 opens to admit air into the main combustion chamber 106. After combustion, the exhaust valve 114 opens to exhaust combustion residuals out of the main combustion chamber 106 and into the exhaust passage 112. Although the concepts herein are described herein with respect to a reciprocating internal combustion engine, the concepts could be applied to other internal combustion engine configurations.

The example internal combustion engine 101 includes an example engine fuel injector-igniter assembly 116. The engine fuel injector-igniter assembly 116 includes a fuel injector 125 and an example igniter plug 124. The fuel injector 125 is arranged for direct injection, meaning that the injector 125 injects fuel directly into the combustion chamber the main combustion chamber 106, rather than into or upstream from the air intake passage 108. In certain instances, the engine 101 can additionally include an injector or other fueling device, not arranged for direct injection, that is coupled to a source of gaseous fuel to introduce the fuel into or upstream from the air intake passage 108.

The example injector-igniter assembly 116 is a generally elongate enclosure located in the head 102 and is threadingly and/or otherwise coupled to the head 102. In some instances, the injector-igniter assembly 116 can extend into the main combustion chamber 106, be flush with a wall of combustion chamber 106, or be recessed from a wall of main combustion chamber 106. The example igniter plug 124 is received inside the example injector-igniter assembly 116 and is coupled to the injector-igniter assembly 116 threadingly and/or otherwise. The injector-igniter assembly 116 defines an outer enclosure around the igniter plug 124 and the fuel injector 125.

A pre-combustion chamber 120 encloses the igniter 124 and is surrounded by outlets of the injector 125. FIG. 1 shows the pre-combustion chamber 120 as an outer chamber inside the injector-igniter assembly 116 adjacent to but separate from the main combustion chamber 106. However, in some instances, the pre-combustion chamber 120 can be formed in the head 102 itself and the injector-igniter assembly 116 can be omitted or the pre-combustion chamber 120 can be integrated with the igniter plug 124 (e.g., in a common or conjoined housing or enclosure). The pre-combustion chamber 120 is shown having a generally symmetrical cylindrical shape about the centerline of the injector-igniter assembly 116, but in other instances the prechamber 120 could be an asymmetrical shape. In some instances, the centerline of the prechamber 120 coincides with the centerline of the injector-igniter assembly 116, but in other instances the prechamber is offset or at a non-parallel angle relative to the centerline of the injector-igniter assembly 116.

The example injector-igniter assembly 116 includes jet apertures 118*a-c*. The jet apertures 118*a-c* are in fluid communication between the interior of the prechamber 120 and the exterior of the prechamber 120. Three jet apertures 118*a-c* are visible in this cross section, yet fewer or more could be provided. The jet apertures 118*a-c* converge to a central passage 126 that opens into the pre-combustion chamber (i.e., "prechamber") 120. The central passage 126 is an axial interior passage that extends from jet apertures 118*a-c*, along the centerline of the injector-igniter assembly 116, to the pre-combustion chamber 120. The central passage 126 channels flow along the centerline of the injector-igniter assembly 116, and as shown, the greatest transverse dimension of the passage 126 is smaller than the greatest transverse dimension of the remainder of the pre-combustion chamber 120. The jet apertures 118*a-c* can number one or more, including one or more that are laterally oriented (e.g., jet apertures 118*a-b*) and/or one or more that are axially oriented (e.g., jet aperture 118*c*), and can be located on the injector-igniter assembly 116 in a symmetric or asymmetric pattern. The jet apertures 118*a-c* allow charge, flame, and residuals to flow between the injector-igniter assembly 120 and the main combustion chamber 106. As discussed in more detail below, air/fuel mixture from combustion chamber 106 is ingested into the pre-combustion chamber 120 through the jet apertures 118*a-c* and the central passage 126 operates to channel the flow along the centerline of the injector-igniter assembly 116 to the igniter plug 124. In certain instances, the central passage 126 channels the flow of air/fuel mixture directly into the ignition gap of the igniter plug 124 and/or through a center jet aperture of an enclosure around the ignition gap of the igniter plug 124. Then, after the air/fuel mixture in the prechamber 120 is ignited, the jet apertures 118*a-c* and central passage 126 operate as jet passages to nozzle combusting air/fuel mixture from the prechamber 120 into divergent flame jets that reach deep into the main combustion chamber 106 and ignite the fuel in the main combustion chamber 106.

The fuel injector 125 is coupled to a fuel source (not shown) of one or more gaseous fuels (e.g., gaseous methane, natural gas, biogas, landfill gas, propane or other gaseous fuels or short chain hydrocarbons referred to as fuel gas) and is configured to directly inject the gaseous fuel into the combustion chamber 106.

The igniter plug 124 is a device configured to initiate a flame kernel to ignite the air/fuel mixture in the combustion chamber 106, such as a spark plug, hot surface igniter, laser igniter, and/or other type of igniter. In some implementations, the igniter plug 124 includes an additional enclosure separate from the prechamber 120 that forms a chamber enclosing the location of ignition. Some examples of igniter plugs that could be used as igniter plug 124 are described in US 2014/0190437, entitled "Quiescent Chamber Hot Gas Igniter," and U.S. Pat. No. 8,584,648, entitled "Controlled Spark Ignited Flame Kernel Flow." Other configurations of igniter are also within the concepts herein.

The example engine system 100 also includes a controller 150 that is communicatively coupled to the injector-igniter assembly 116. The controller 150 can send signals to the injector-igniter assembly 116 to inject fuel through the fuel injector 125 into the pre-combustion chamber 120. In some implementations, the controller 150 signals the injector-igniter assembly 116 to inject fuel multiple times as multiple separate fuel injection events. The controller 150 can time the signals such that the fuel is injected for a particular duration of time. The controller 150 can also signal the igniter plug 124 to ignite the mixed fuel and air in the prechamber 120. The controller 150 can send signals of different types in any order. For example, the controller 150 can send one or more signals to inject fuel and send one or more of signals to operate the igniter. In some implementations, the controller 150 simultaneously sends signals to inject fuel and signals to ignite. The controller 150 can be included as part of the engine system 100 or as part of the injector-igniter assembly 116 or as part of another system.

In some instances, the spark plug 124 can be replaced by any igniter including, for example, nano-pilot (i.e., small drop of diesel fuel or engine oil), laser spark spot, corona or plasma ignition.

In some instances, a glow plug functions to heat spark chamber—this can also be accomplished by adding gas feed—just to the spark chamber—reducing the amount of gas substantially.

Figure 2:
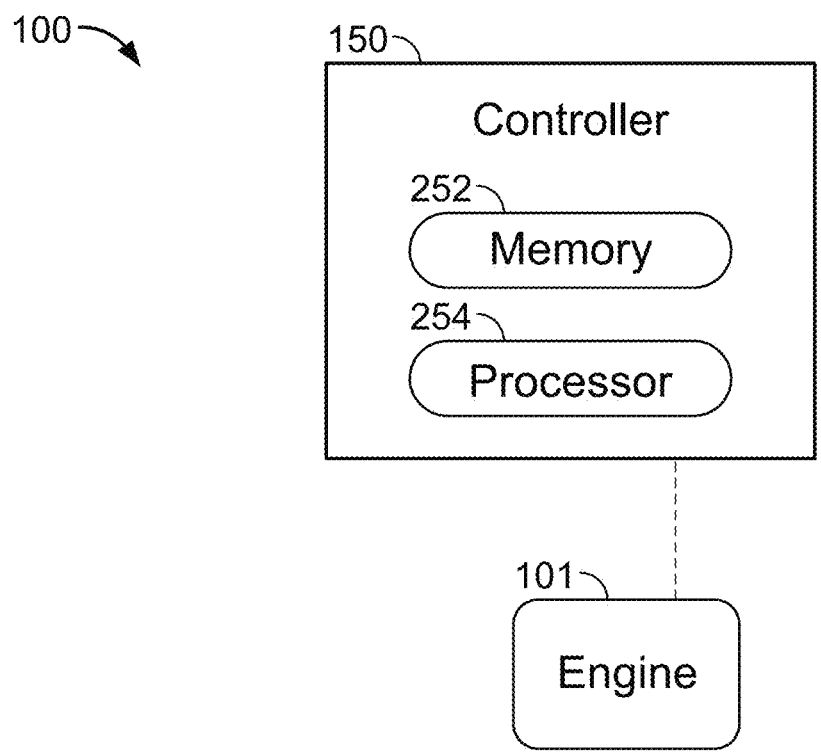
FIG. 2 is a schematic of controller that is communicatively coupled to an example engine.

FIG. 2 shows a schematic of controller 150 that is communicatively coupled to an example engine 101. The controller 150 can send signals to the engine 101 to trigger fuel injection and/or ignition events. The controller 150 includes a memory 252 and a processor 254. The memory 252 is a computer-readable medium that stores instructions, such as instructions to perform the methods described herein, that are operable to be performed by the processor 254. The processor 254, for example, can be a computer, circuitry, a microprocessor, or another type of data processing apparatus. In some implementations, some or all of the controller 150 is integrated with the engine system 100.

Figure 3:
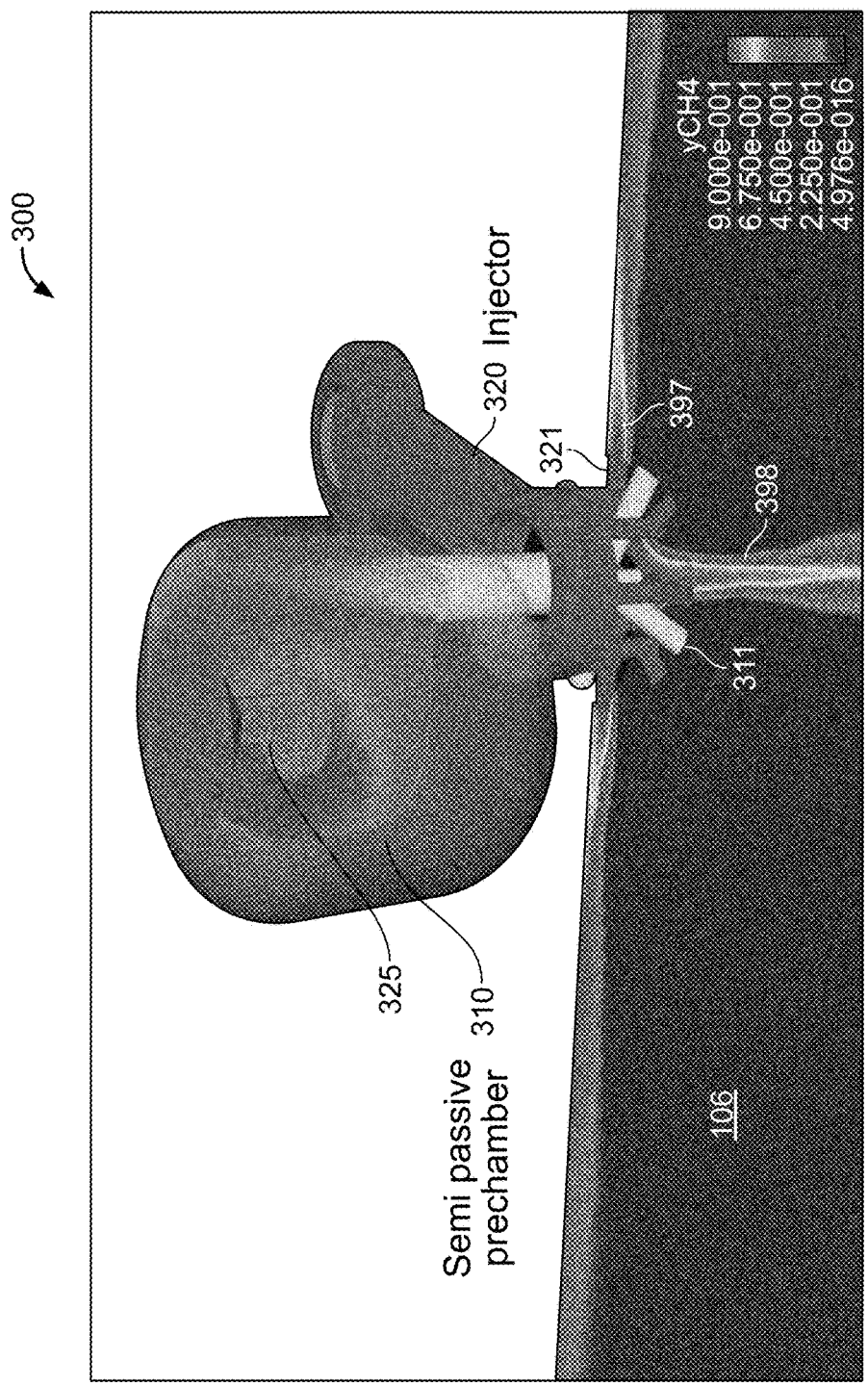
FIG. 3 is an illustration of an example prechamber and injector assembly showing computational results of fuel injection into a combustion chamber.

FIG. 3 is an illustration of an example prechamber 310 and injector 320 assembly 300 showing computational results of fuel injection into the combustion chamber 106. FIG. 3 also overlays a 2D computational simulation of the fuel concentration in the combustion chamber 106, as indicated by the shading. In the computational simulation shown, fuel is injected from the injector 320 via an injection passageway (shaded to indicate 100% fuel concentration) into the main combustion chamber 106. The fuel injector 320 passageway is in fluid communication with the main combustion chamber 106 via a plurality of horizontally disposed fuel nozzles 321 and four convergent fuel nozzles (shown more clearly in FIG. 4). The fuel nozzles 321 expel fuel jets 397, 398 into the main combustion chamber 106 in the immediate vicinity of the jet apertures 311 in fluid communication with the prechamber 310. In some instances, the fuel nozzles 321 may be fuel holes, apertures, or openings. Subsequently, the fuel 397, 398 is mixed with the air in the main chamber 106 and ingested into the prechamber 310 through the apertures 311 during the compression stoke of the piston 104 of the engine 100. After ingestion, ignition occurs in the prechamber 310 and spreads into the main combustion chamber 106 through rapid expulsion of combustion gasses from the jet apertures 311. In some instances, electrodes 325 of a spark plug 124 in the prechamber 310 ignite the air-fuel mixture in the prechamber 310 to initiate ignition. In some instances, because the prechamber 310 does not completely fill with fuel, a fuel-rich mixture is created in front of the prechamber 310 so that the prechamber 310 contains a correct overall AFR upon ignition.

In some instances, passive prechamber 310 filling means that a rich fuel zone, with a low velocity, is created in front of the entrance to the prechamber 310 and the compression stroke (i.e., motion of the piston in a direction towards the prechamber 310) passively flows the fuel from the rich fuel zone into the prechamber 310.

In some instances, all of the fuel for the combustion cycle is injected directly into the main combustion chamber 106.

FIG. 4 an illustration of the example prechamber 310 and injector 320 assembly 300 of FIG. 3, showing the convergent fuel nozzles 422. As detailed above, the fuel injector nozzles 321, 422 fill main combustion chamber 106 with jets of fuel 397, 398. In some instances, the jets of fuel 397, 398 are directed to maximize mixing in the region adjacent to the apertures 311 into the prechamber, and, in some instances, are also directed to target top liner regions of the main combustion chamber 106 in order to cool exposed components, for example, the head 102, the valves 110, 114 or a liner (not shown). The peripheral fuel injector nozzles 321 are configured to fill the main combustion chamber 106 with the fuel necessary for combustion, and, in some instances, are arranged to maximize mixing of the fuel 397, 398 in the main combustion chamber 106. Additionally, the jets of fuel 397, 398 thermally interact with engine components exposed in the main combustion chamber 106 and help dissipate any hot spots that form on the exposed surface by absorbing thermal energy into the fuel 397, 398. In this manner, by directing the gaseous fuel 397 injection toward the cylinder liner near the top of the liner, the fuel 397 is able to cool the liner and reduce or eliminate an auto-ignition reaction rate that may otherwise occur in reaction to the temperature of the liner (or other components) causing auto-ignition in the main combustion chamber 106.

Figure 5A:
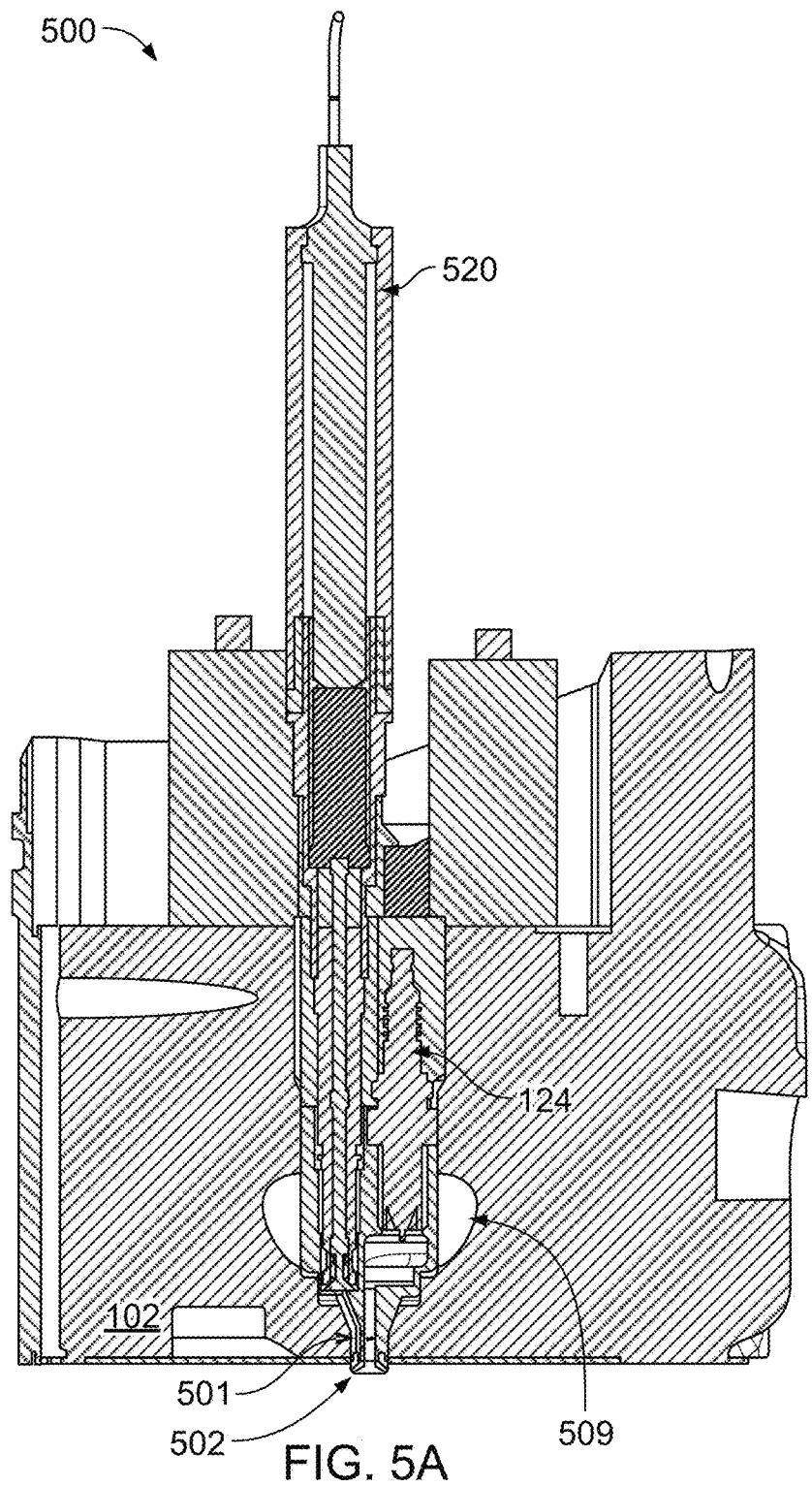
FIGS. 5A-C are cross-section illustrations of an example injector-igniter assembly.
Figure 5B:
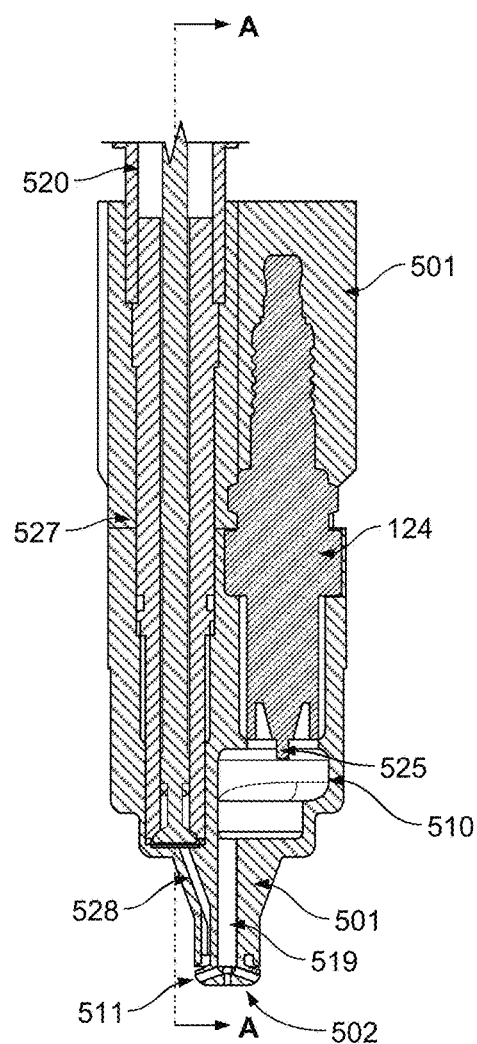
Figure 5C:
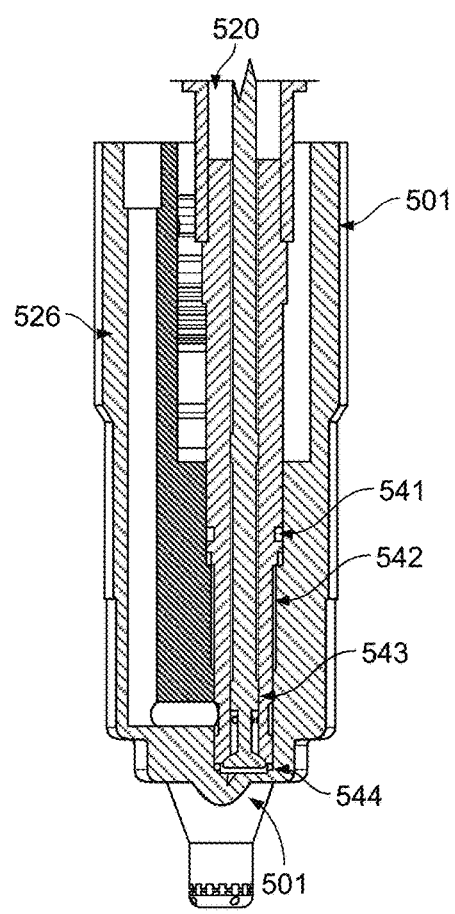

FIGS. 5A-C are cross-section illustrations of an example injector-igniter assembly 500 that includes aspects of the concepts herein. FIG. 5A illustrates the injector-igniter assembly 500 including a housing 501 disposed in the head 102 of an internal combustion engine 100, which, in some instances, forms a water cooling jacket 509 around an exterior of the housing 501 of the injector-igniter assembly 500. The housing 501 includes a tip-end extending from the head 102 and into the main combustion chamber 106 (not shown in FIGS. 5A-5C) of the internal combustion engine 100. A fuel injector 520 and a spark plug 124 are retained in a housing 501 of the assembly 500. The housing 501 contains a fuel passage 528 (shown in FIG. 5B) configured to introduce fuel from the fuel injector 520 to fuel outlet nozzles opening into the main combustion chamber 106. In some instances, the housing 501 is integrated into the head 102 of the engine.

FIG. 5B illustrates a zoomed-in view of the housing 501 of the injector-igniter assembly 500, showing the fuel passage 528, the prechamber 510, and the valve group 527 of the fuel injector 520. The fuel passage 528 is outside of the prechamber 510 and receives fuel from the valve group 527 of the fuel injector 520. The fuel passage 528 fluidly couples the fuel injector 520 with a plurality of fuel nozzles 529 disposed at the tip end 502 of the housing 501, which is shown in more detail in FIGS. 7A and 7B. Continuing to refer to FIG. 5B, the fuel passage 528 from the fuel injector 520 is integrated with the housing 501 that defines the central passage 519 between the jet apertures 511 and the prechamber 510. Also illustrated in FIG. 5B, the prechamber 510 receives the electrodes 525 of the spark plug 124 at one end in order to initiate combustion in the prechamber. The prechamber 510 is in fluid communication with the main combustion chamber 106 via the central passage 519 that extends from the prechamber 510 to the tip jet apertures 511 at the tip end 502 of the housing 501. In this configuration, an ignition event initiated in the prechamber 510 by the electrodes 525 of the spark plug 124 causes a combustion event to spread throughout the prechamber 510, and the combustion event in the prechamber 510 forces combustion gasses though the central passage 519 and out the jet apertures 511 to spread throughout the main combustion chamber 106.

FIG. 5C is a cross-section of the assembly 501 of FIG. 5B taken at through plane A, as shown in FIG. 5B. FIG. 5C illustrates the sealing components between the housing 501 and the valve group 527 of the gas fuel injector 520. A gasket seal 541 is present between the valve group 527 and the body. An interface 542 seal is present between the first seal and a combustion gas seal 544. Inside the valve group 527 is a dynamic gas/air seal 543, and a fuel inlet 526 provides fuel to the fuel injector 520. In some embodiments, and as shown in more detail in FIG. 6, a gas fuel injector may be integrated with the housing 501.

Figure 6:
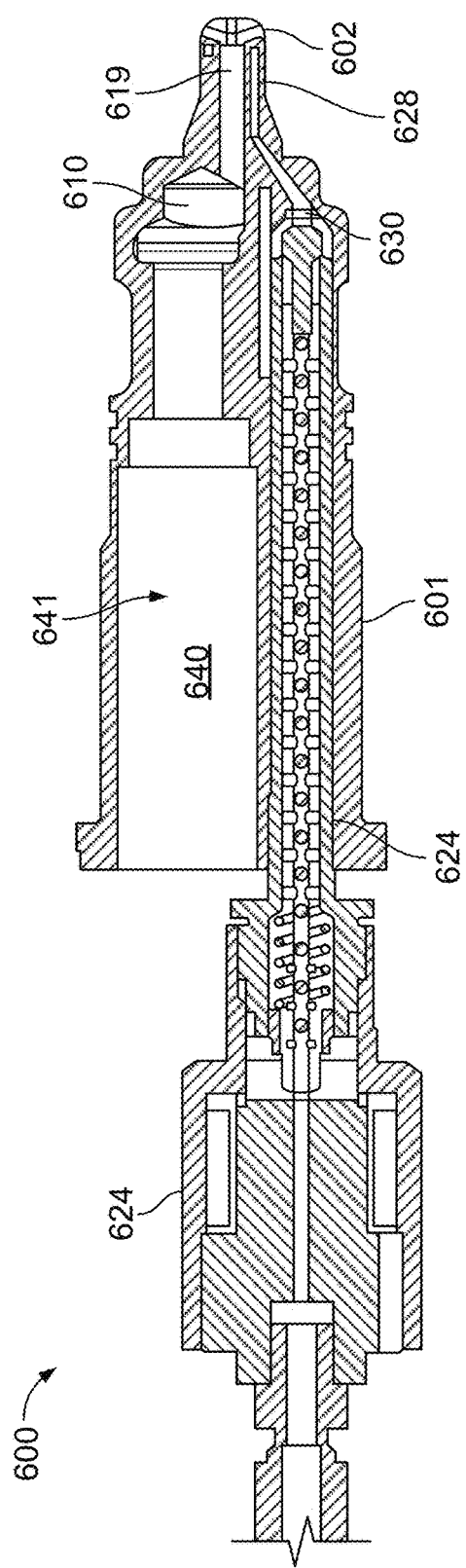
FIG. 6 is a cross-section illustration of a parallel passive injector-igniter assembly with an integral gas injector.

FIG. 6 is a cross-section illustration of a parallel passive injector-igniter assembly 600 with an integral gas injector 620 deposed in the housing 601 of the assembly 600. The tip end 602 of the housing 601 includes two parallel fluid passageways, the fuel passageway 628 and the central passage 619 to the prechamber 610. The gas injector 620, which is, in some instances, a 11A1 gaseous fuel injector, includes an injector sleeve 624 inserted into the housing 501. In some instances, the distal end 630 of the injector sleeve 624 is sealed to the housing 501 with a crush gasket that seals a fluid coupling between the gas injector 620 and the fuel passageway 628 to the main combustion chamber 601. The housing 601 also includes an igniter chamber 641 defining a void 640 (i.e., a receptacle) where an igniter, such as a spark plug 124, is inserted into the housing 501, with a distal end enclosing the prechamber 610. In some instances, the igniter is a laser igniter or a glow plug.

Figure 7A:
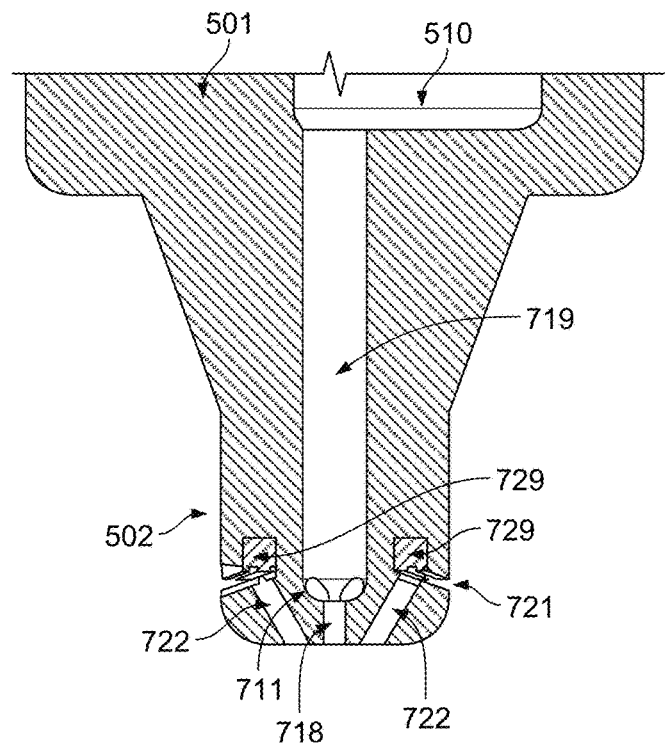
FIGS. 7A and 7B are a cross-sectional and a perspective views, respectively, of the tip of the injector-igniter assembly of FIGS. 5A-C, showing the outlet of the fuel passages relative to the jet apertures.
Figure 7B:
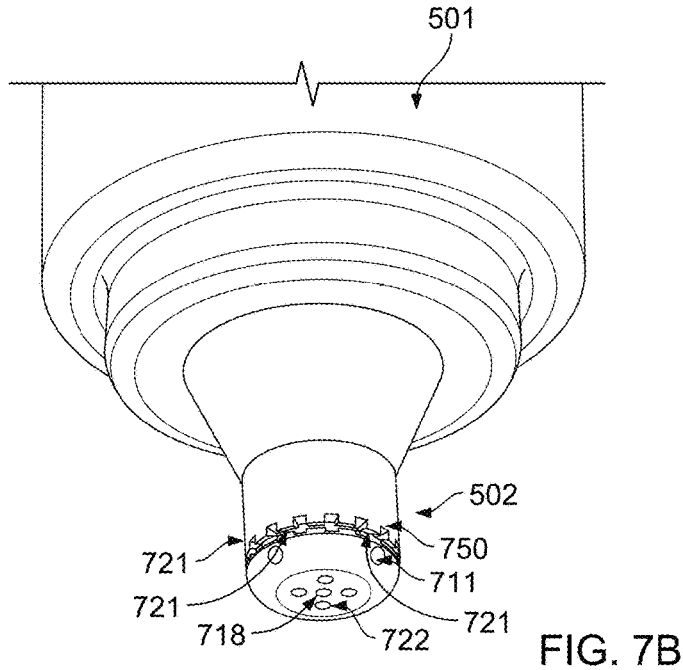

FIGS. 7A and 7B are a cross-sectional and a perspective views, respectively, of the tip end 502 of the housing 501 of the injector-igniter assembly 500 of FIGS. 5A-C, showing the locations of fuel outlet nozzles 721, 722, from the fuel passages 528 relative to the jet apertures 711, 718. FIG. 7A illustrates the prechamber center channel 719 extending to the tip end 502 and dividing into a central jet aperture 718 and four peripheral jet apertures 711. In some instances, the fuel passage way 528 (not shown) provides fuel to an annular manifold 729 surrounding the prechamber center channel 719, and the annular manifold 729 provides fuel to a series of radial fuel outlet nozzles 721 and four central fuel outlet nozzles 722. In some instances, the fuel outlet nozzles 721 directed radially or near radially tend to cause turbulence in the main combustion chamber 106 to improve mixing and combustion. In some instances, the central fuel outlet nozzles 722 create a cloud of fuel in the vicinity of the central jet aperture 718 to facilitate the passive ingestion of the fuel-rich air mixture into the prechamber 510 during the compression stroke of the engine 100. In some instances, the orientation of the fuel outlet nozzles 721, 721 changes the fill rate of the prechamber 510 by, in some instances, affecting the fuel-air ratio of the mixture ingested into the prechamber. This result in shown in detail in FIGS. 8A-8C. At a high level, fuel is injected directly in the main combustion chamber 106 and the prechamber ingests a portion of the injected fuel in a passive manner during the compression of the main combustion chamber 106.

FIG. 7B is a perspective illustration of the exterior locations of the fuel outlet nozzles 721, 722 and the jet apertures 711, 718. Some of the fuel outlet nozzles 721, 722 direct the fuel radially (i.e., the radial fuel outlet nozzles 721) or near radially (e.g., at an acute angle to radial), and some (i.e., the central fuel outlet nozzles 722) direct the fuel to converge upstream of the central jet aperture 722. As shown in FIG. 7B, the radial fuel outlet nozzles 722 exit through a series of crenelations or serrations 750 that increase the turbulence in the radial fuel flow 397 to induce faster mixing of the fuel flow 397 with the air in the main combustion chamber 106. In some instances, the fuel outlet nozzles 721, 722 include vortex-generating or turbulence generating surfaces or structures to promote rapid mixing of the gaseous fuel with the air in the main combustion chamber 106.

Figure 8A:
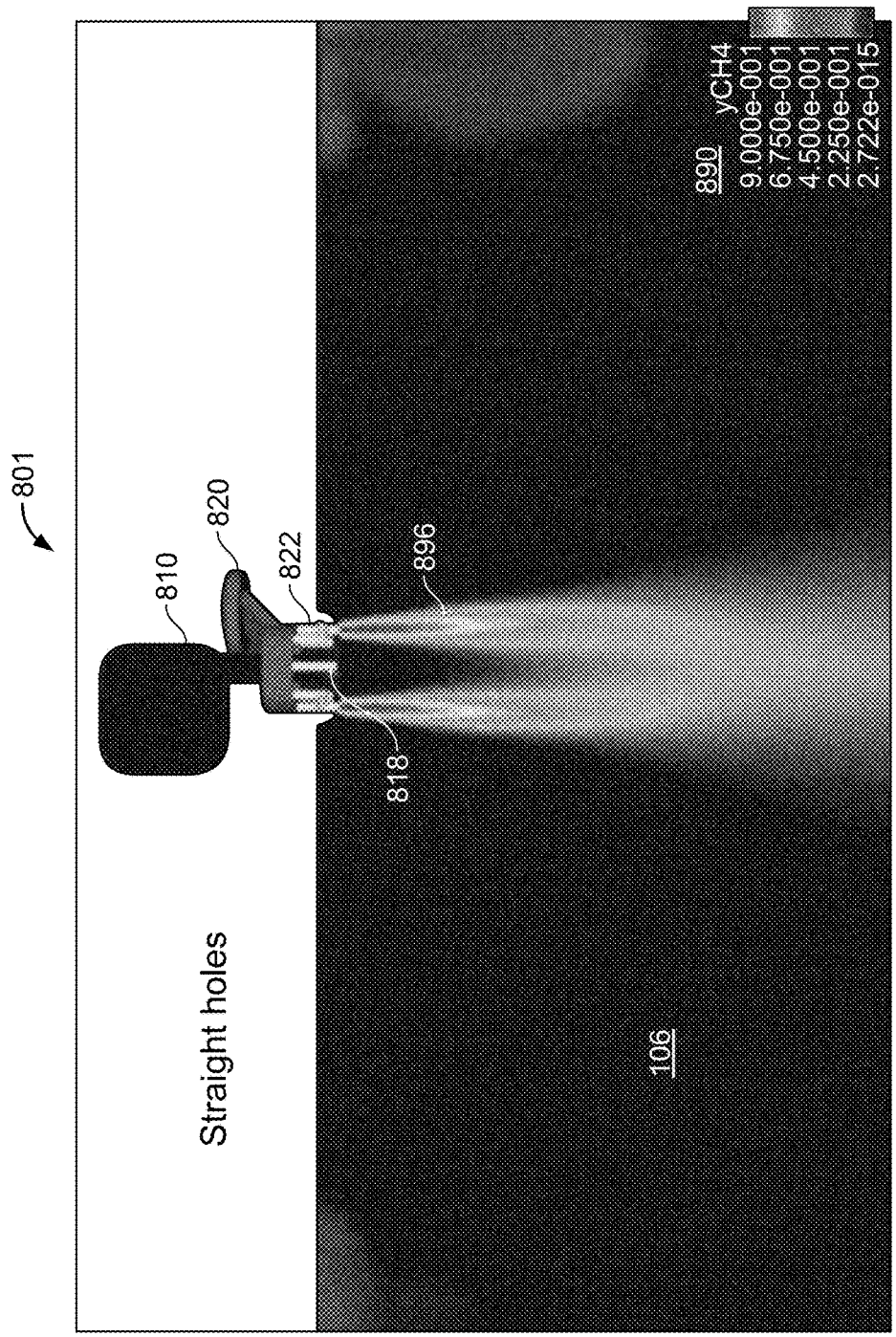
FIGS. 8A-8C are computational results of air-fuel-ratio in a main combustion chamber and within a prechamber for different orientations of fuel outlet nozzles.
Figure 8B:
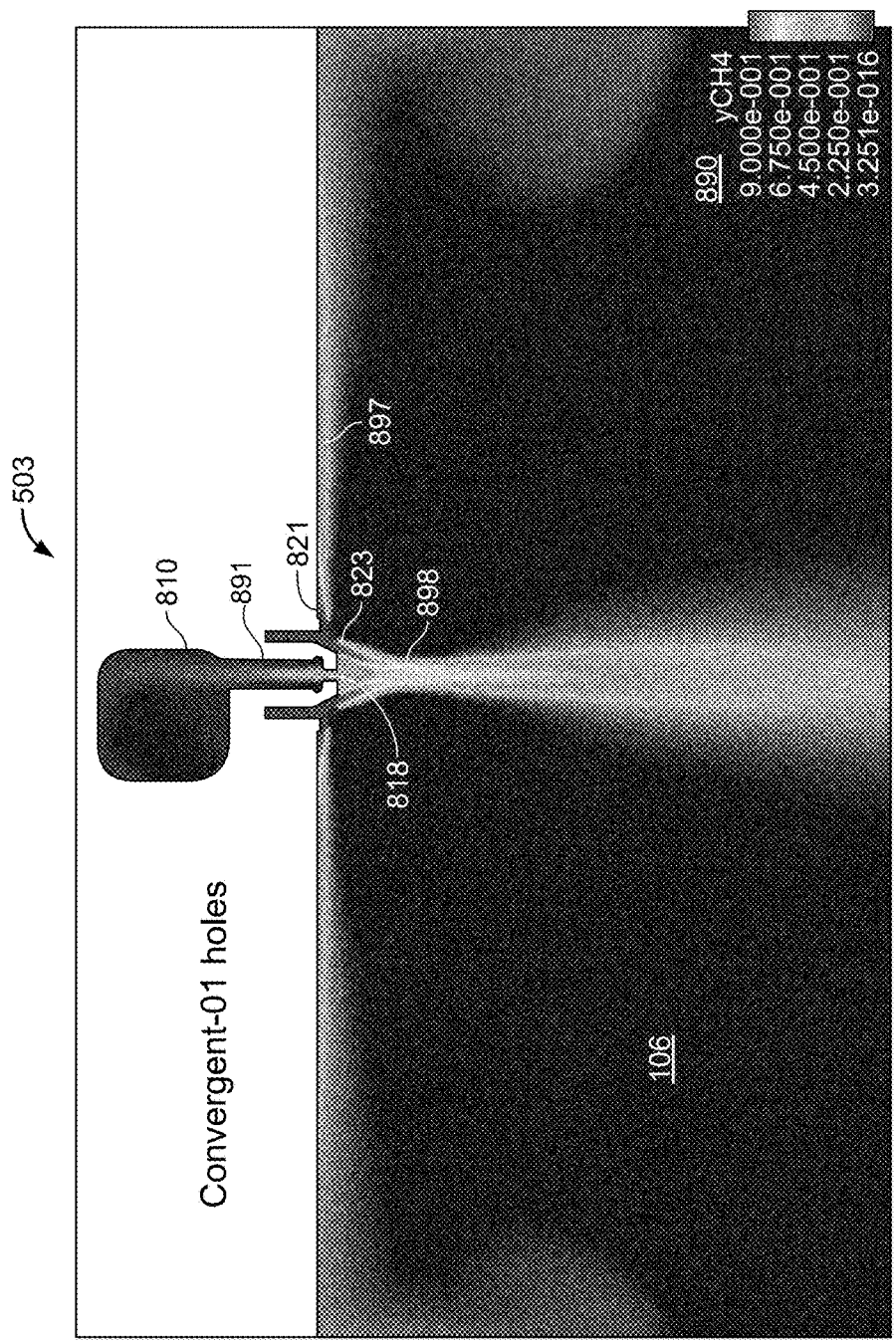
Figure 8C:
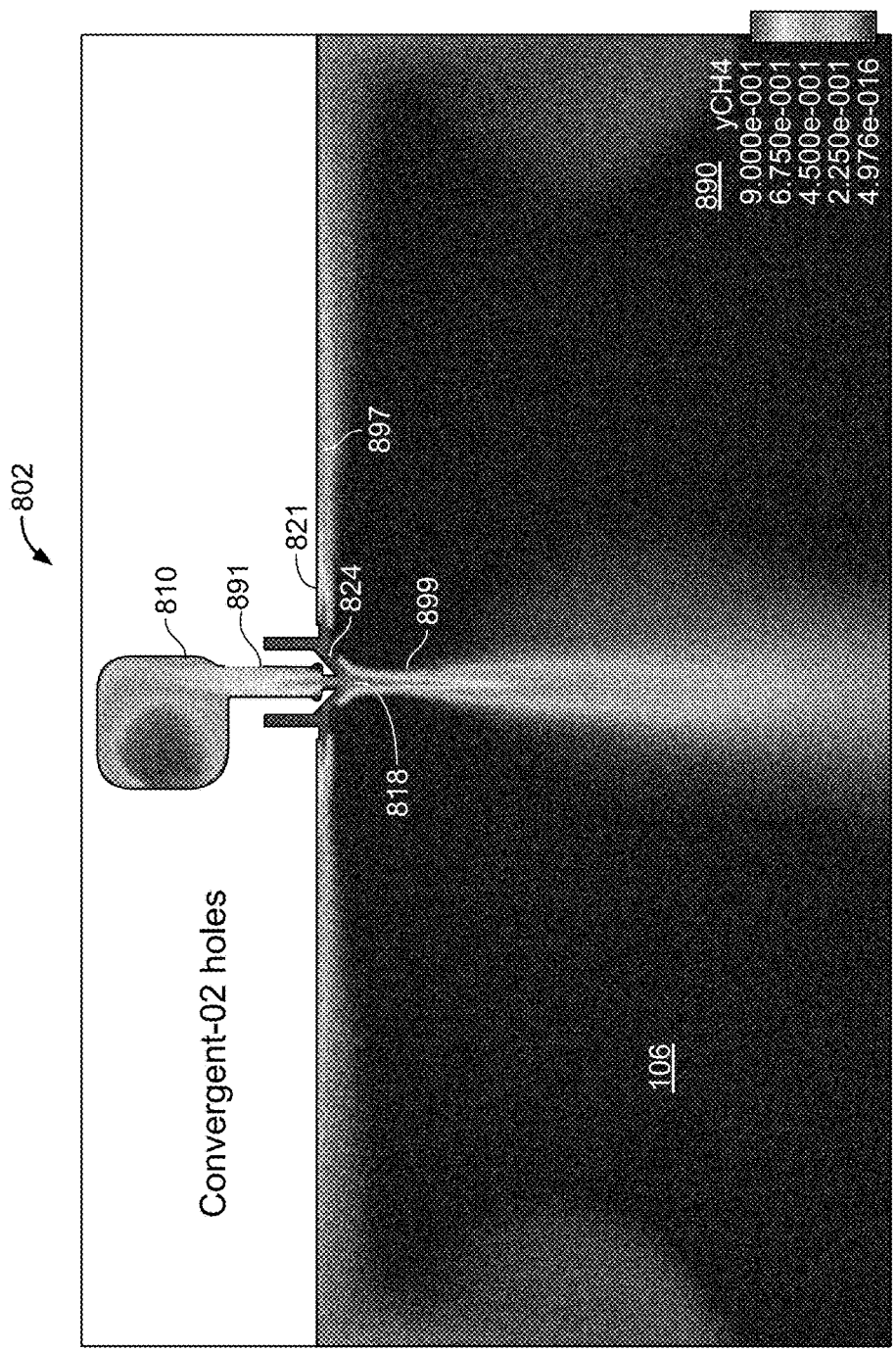

FIGS. 8A-8C are computational results shown after start of injection at about 90 degrees before TDC of air/fuel ratio in the main combustion chamber 106 and within a prechamber 810 for different orientations of fuel outlet nozzles 821, 822, 823, 824 supplied with fuel from a fuel injector 820. Three different fuel outlet nozzle 821, 822, 823, 824 orientations shown leads to different mixing patterns in the main combustion chamber 106 and different concentrations of fuel 890 ingested by the prechamber 810. The air/fuel ratio in the prechamber 810 is affected by the angle of the nozzles 821, 822, 823, 824, and in particular, the air/fuel ratio in the prechamber 810 decreased (i.e., richer) as the fuel outlet nozzle 823, 824 convergence increases. FIG. 8A illustrates axially orientated (i.e., straight downward) fuel outlet nozzles 822 injecting fuel into the main combustion chamber 106 in an axial direction parallel to the central jet aperture 818. Note that concentration of fuel present in the prechamber 810 is similar to the concentration of the main combustion chamber 106 far from the straight fuel flow 897, which indicates that, for this moment in the computation simulation, very little fuel has entered though prechamber 810 compared to the amount shown injected into the main combustion chamber 106.

FIG. 8B illustrates convergent fuel outlet nozzles 823 injecting fuel into the main combustion chamber 106 in a direction convergent on a point directly below the central jet aperture 818. A flow 891 of fuel is entering the prechamber 810 through the central jet aperture 818 as a result of the convergent fuel outlet nozzles 823 generating a fuel-rich zone adjacent to the central jet aperture 818 and the compression of the main combustion chamber drive the passive flow 891.

FIG. 8C illustrates axially orientated fuel outlet nozzles 821 injecting fuel into the main combustion chamber 106 in the axial direction parallel to the central jet aperture 818. A more substantial flow 892 of fuel is illustrated entering the prechamber 810 through the central jet aperture 818, as compared to the flow 891 of FIG. 8B. This more substantial flow 892 of fuel is result of the convergent fuel outlet nozzles 824 expelling fuel along trajectories that interact closer to the central jet aperture 818, thereby increasing the fuel content in the fuel-rich zone surrounding the central jet aperture 818, as compared to the zone of FIG. 8B.

Additionally, in FIGS. 8B and 8C, radial fuel outlet nozzles 821 direct a horizontal fuel flows 897 along the head 102, over the valves 110,114 and toward the liner, thereby cooling the areas which are, in some instances, primarily responsible for providing the heat necessary to initiate auto-ignition events and, therefore, knock. The 3 different hole configurations shown in FIGS. 8A-8C determine the amount of fuel in the prechamber. In some instances, without a convergent hole configuration, it may not be possible to both passively fill the prechamber 810 with an adequate amount of fuel for combustion to occur in the prechamber 810 and inject the fuel with enough pressure and velocity to full the main combustion chamber 106.

Figure 9:
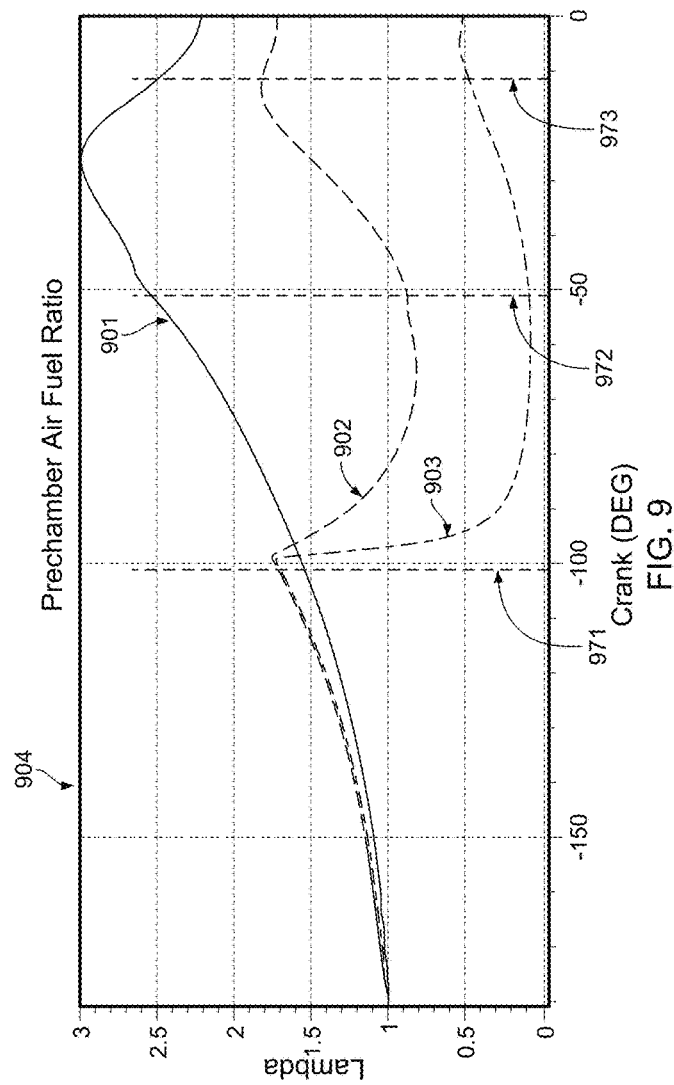
FIG. 9 is a graph of the air-fuel-ratio in each of the prechambers of FIGS. 8A-8C during a compression stroke of an engine.

FIG. 9 is a graph 904 of the air-fuel-ratio 901, 902, 903 in each of the prechambers 810 of FIGS. 8A-8C during a compression stroke of an engine 100. FIG. 9 illustrates the variation in the AFR (lambda) in the prechamber 810 depending upon the nozzle hole style (i.e., fuel outlet nozzles 822, 823, 824 of FIGS. 8A-8C) as well as a function of the timing (−100 to −50 CA). FIG. 9 illustrates that the air/fuel ratio in the prechamber 810 corresponding to each nozzle style is affected by the angle of the fuel outlet nozzles 822, 823, 824, and in particular, the air/fuel ratio 901, 902, 903 in the prechamber 801 is richer (i.e., lower) as the nozzle 822, 823, 824 convergence increases. The straight holes 901 resulted in almost no fuel reaching the prechamber. The convergent-01 holes 901 resulted in fuel ingested into the prechamber 801 from the start of injection 971 until the end of injection 972, with some fuel leaving the prechamber prior to the spark time 973. The convergent-02 holes 901 resulted in increased fuel ingested into the prechamber 801 from the start of injection 971 until the end of injection 972 and with less fuel leaving the prechamber prior to the spark time 973, as compared with the convergent-01 holes 901. The increased convergence of the convergent-02 holes increased the fuel ingested by the prechamber by increasing the fuel concretion at the opening of the central jet aperture 818. The results of the straight holes 901 illustrate that, without convergent fuel outlet nozzles 823, 824, the prechamber 810 remains very lean during each combustion cycle.

Accordingly, FIG. 9 illustrates it is possible to inject fuel until TDC and geometrically control the A/F ratio in prechamber 810. Given this control, the prechamber 810 enables faster combustion. That is to say, combustion can be initiated close to or after TDC to avoid increase of pressure and temperature during compression stroke, which may result in knock. Generally, examples of the present system enable controlling AFR inside the prechamber 810 independent of injection time 971, 972 and, therefore, permit termination fuel injection close to TDC. Generally, what is shown is that it is possible to optimized the effective AFR in the prechamber 810 be optimized by (a) injection jetting pattern and (b) injection timing to create a cloud of fuel/air mixture outside the prechamber 810 that will be ingested into the prechamber 810.

Figure 10:
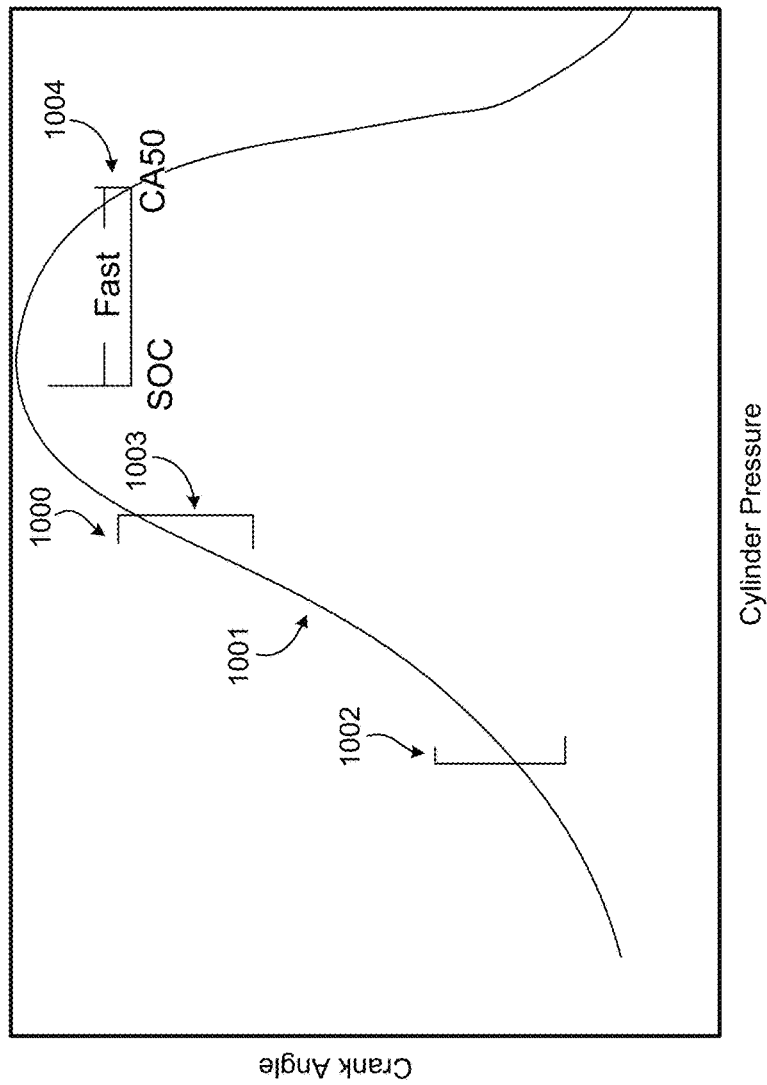
FIG. 10 is a graph of a combustion pressure curve showing the windows necessary to avoid knock while keeping an injection pressure requirement low.

FIG. 10 is a graph 1000 of a combustion pressure curve 1001 showing the timing windows 1002, 1003 necessary to avoid knock while keeping an injection pressure requirement low. If the fuel injection starts too early, for instance, before the first window 1002, then auto-ignition reactions begin too early and work to enhance the knock tendency of the engine. If the fuel injection is too late, for instances, after the second window 1003, then the subsequent increases in the compression curve 1001 increase the fuel injection pressure needed to inject fuel into the main combustion chamber 106. By controlling these two parameters, injecting between the "knock limit" window and the "high pressure window" it is possible to deliver the fuel needed in the narrow time window (i.e., between 1002 and 1003) and avoid knock, while keeping the pressure requirement low. Because the fuel is injected during the compression stroke, not after, in some instances, the pressure of the direct gaseous fuel injection is typically in the medium pressure range from between 30 bar and 100 bar and typically less than the peak motored compression pressure.

In some instances, the engine 100 has a high compression ratio. In some instances, the compression ratio is greater than 13.5. Embodiments of the present system work with various gaseous fuel distribution methods, including, for example, stratified, pulsed, and direct injection. In some instances, a late start of combustion such as later than 5 BTDC to 5 ATDC, in combination with the fast combustion examples described herein, results in a CA50 on or around 10 degrees after TDC without knock and with a high compression ratio, for example, 13.5:1. A typical gas engine compression ratio might be around 11.5:1 with normal valve timing and 12.5 with Miller Cycle, where a diesel might have a very high CR (e.g., above 16.5:1). so high compression ratios for gas engines would be in the range from 12.5:1 to 16.0:1.

In some instances, if knock occurs, the injection timing or quantity of fuel injected is retarded to reduce the compression heating time of the end gas. Fast combustion resulting from implementation of the present system enables meeting optimal C50 location, even with a late fuel injection start. In some instances, combustion is complete in less than 12 degrees of crank angle. In some instances, controlling the beginning of fuel injection initiates the time for an auto-ignition process to begin. By precisely controlling the start and end of fuel injection, good mixing is achieved while knock tendency is suppressed as a result of due the residence time of the late injected gas.

Figure 11A:
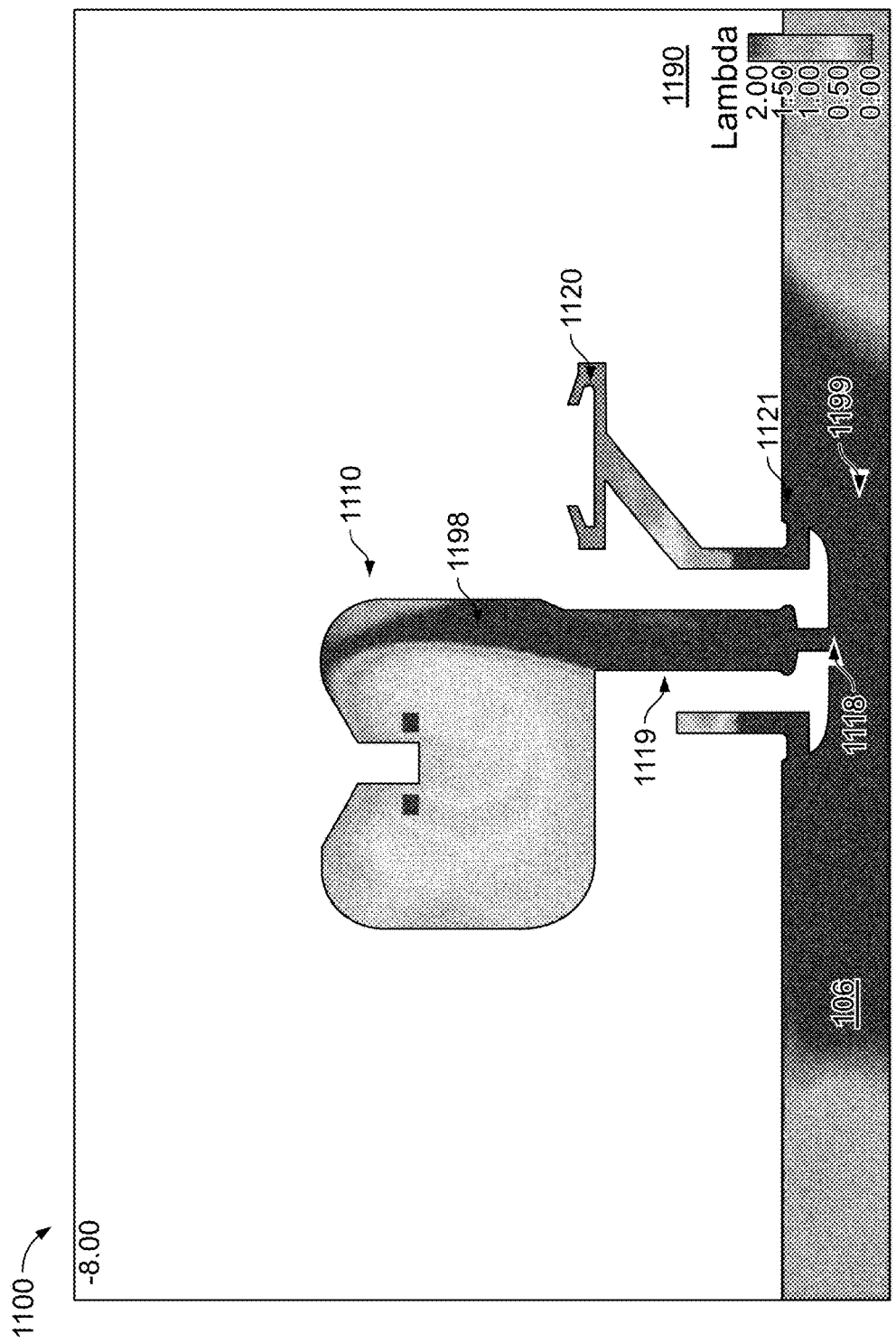
FIG. 11A is a computational result of air-fuel-ratio in a prechamber and a main combination chamber before ignition.

FIG. 11A is a computational result of air-fuel-ratio 1190 in a prechamber 1110 and a main combination 106 chamber before ignition. Green represents lambda 1.0 or stoichiometric which is suitable for good combustion initiation and notably flushed between the spark plug electrodes to ensure good flame propagation following the spark between the electrodes. FIG. 11A shows a fuel injector 1120 providing a flow of fuel 1199 to the main combustion chamber 106, and a portion 1198 of that fuel 1199 being ingested into the pre chamber 1110 though a central jet aperture 1118 and a central passage 1119.

Figure 11B:
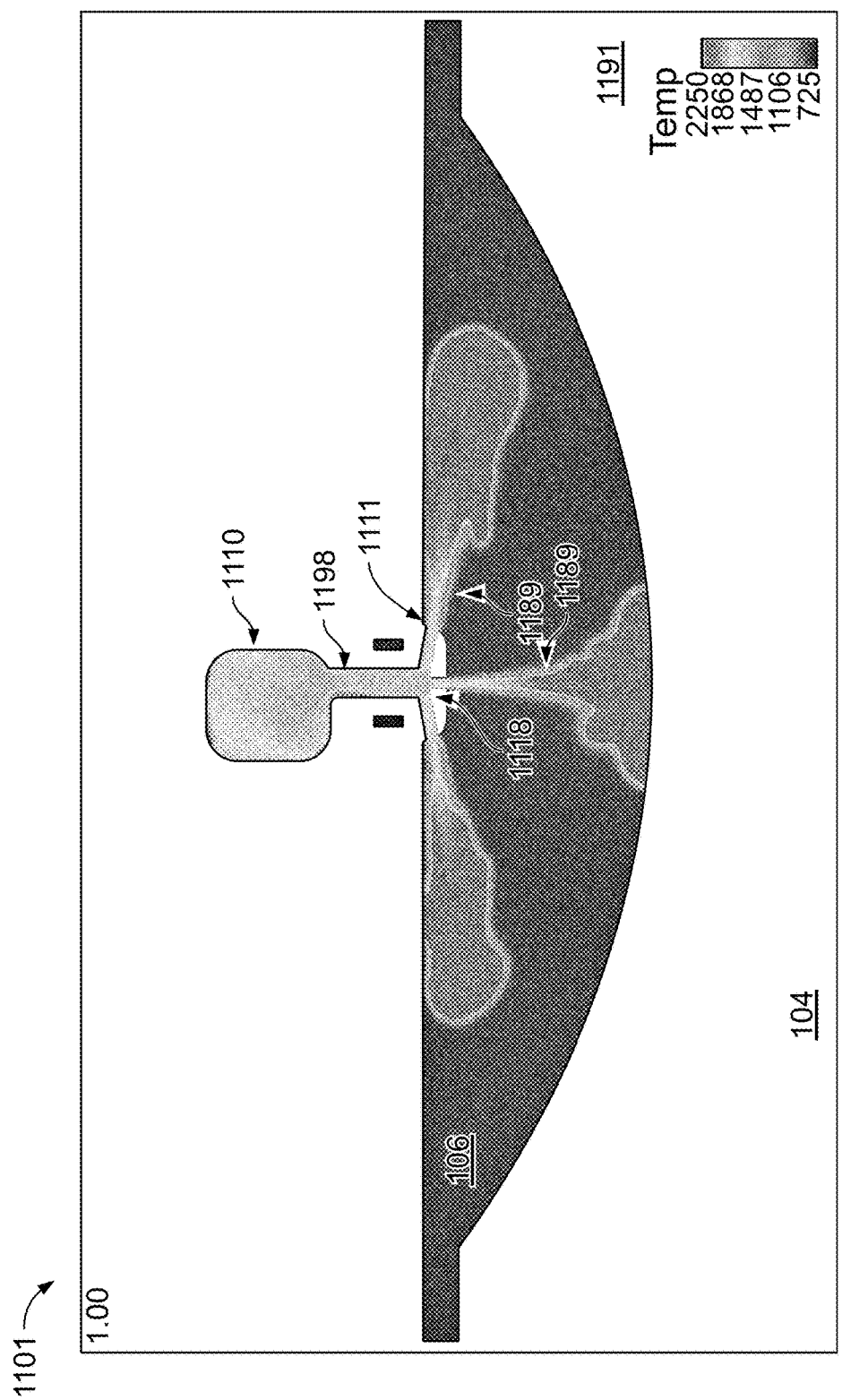
FIG. 11B is a computational result of temperature in a prechamber and a main combination chamber after ignition.

FIG. 11B is a computational result of temperature in a prechamber and a main combination chamber after ignition. FIG. 11B illustrates the computation set-up of FIG. 11A at a time just after ignition. Note that the cross-section of FIG. 11B is different than FIG. 11A, and the radial fuel nozzles 1121 are no longer seen, but the peripheral jet apertures 1111 are visible. The temperature 1191 in the main combustion chamber and in the prechamber 1110 is depicted. Visible are the high-temperature jet 1189 expanding outwards from the center jet aperture 1118 and peripheral jet apertures 1111. The high-temperature jets 1189 are driven from the jet apertures 1111, 1118 by the high temperature (i.e., high pressure) combustion visible in the prechamber 1110 after ignition of the air-fuel mixture ingested by the prechamber 1110 during the compression stoke (see FIG. 11A) of the piston 104 of the engine 100.

FIG. 12 is a graph 1200 of pressure in the prechamber 1210 and the pressure in the main combustion chamber 1206 of FIGS. 11A and 11B during the combustion event. FIG. 12 illustrates the large pressure spike in the prechamber 1110 pressure 1210, peaking at the TDC position of the piston 104 (i.e., crank angle 0). This pressure spike corresponds to the peak ignition pressure in the prechamber 1110, and FIG. 12 illustrates an ignition event occurring around 6 degrees before TDC, as indicated by the prechamber pressure 1210 increasing above the main combustion chamber pressure 1206. As the combustion in the prechamber 1110 drives the combusting air-fuel mixture (i.e., high-temperature jets 1189 of FIG. 11B) into the main combustion chamber 106, the pressure in the prechamber 1110 decreases and the pressure 1206 in the main combustion chamber 106 increases as the fuel-air mixture in the main combustion chamber 106 is ignited and the main combustion event is driven.

Figure 13:
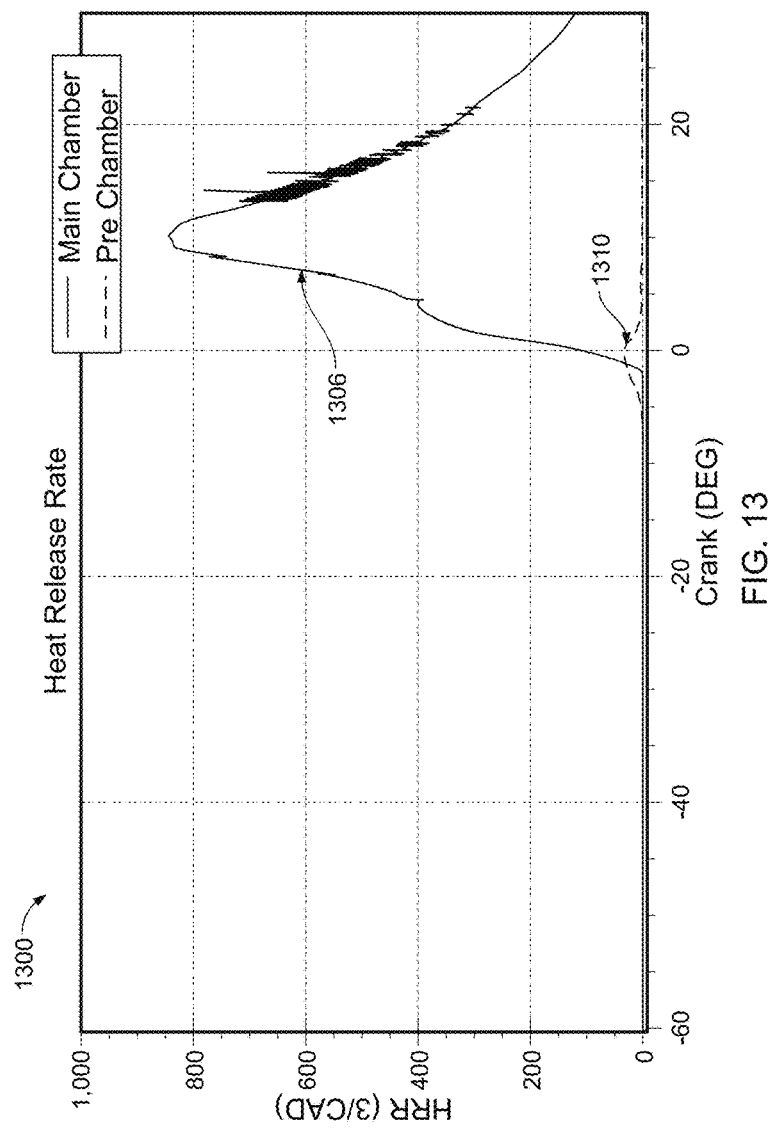
FIG. 13 is a graph of heat release rate in the prechamber and the main combustion chamber of FIGS. 11A and 11B during the combustion event.

FIG. 13 is a graph of heat release rate 1310 in the prechamber 1110 and the heat release rate 1306 main combustion chamber 106 of FIGS. 11A and 11B during the combustion event. The heat release rate 1310 in the prechamber 1110 increases at the start of ignition (i.e., around 6 degreed before TDC) and the combusting air-fuel mixture driven into the main combustion chamber 106 corresponds to the steep slope of the increase in heat release rate 1306 in the prechamber 106. That is, the speed of the propagation of the high-temperature jets 1189 in the main combustion chamber 106 accelerates the initial heat release rate 1306 by spreading the combustion event faster than the speed of the flame front.

Certain aspects of the present invention include a method of combusting gaseous fuel in a main combustion chamber of an internal combustion engine. The method includes receiving gaseous fuel into the main combustion chamber through an injector orifice to mix with air in the main combustion chamber, the internal combustion engine includes a prechamber having a jet aperture in fluid communication between an interior of the prechamber and the main combustion chamber, the gaseous fuel being received in the main combustion chamber in a trajectory that crosses the jet aperture, flowing, during compression of the main combustion chamber, mixed gaseous fuel and air into the prechamber though the jet aperture, the compression passively flowing the mixed gaseous fuel and air, igniting, in the prechamber, the mixed gaseous fuel and air ingested into the prechamber from the main combustion chamber, and expelling ignited gaseous fuel and air from the prechamber through the jet aperture and into the main combustion chamber as a flaming jet.

In some examples, a bleed port connects the main fuel injection passage to the prechamber enabling some leakage of fuel to simultaneously fuel the main combustion chamber and a portion of the prechamber.

In some examples, the injector orifice includes a plurality of injector orifices including a first subset oriented to direct fuel in a converging trajectory, and a second subset oriented to direct fuel in a radial direction.

In some examples, injecting gaseous fuel into the internal combustion engine through the injector orifice to mix with air in the main combustion chamber includes forming a cloud of gas surrounding the jet aperture and where the cloud of gas forms a fuel-rich gaseous mixture, where the compression passively flows the fuel-rich gaseous mixture into the prechamber.

In some examples, the jet aperture includes an axial jet aperture oriented along a longitudinal axis and a plurality of peripheral jet apertures oriented away from the longitudinal axis.

In some examples, the prechamber is a passively fueled chamber having no fuel supply directly into the prechamber.

In some examples, injecting gaseous fuel into the internal combustion engine through the injector orifice includes flowing the gaseous fuel across one or more serrations formed in the injector orifice.

In some examples, injecting gaseous fuel into the internal combustion engine through the injector orifice includes injecting the fuel at a pressure between 30 and 100 bar.

In some examples, injecting gaseous fuel into the internal combustion engine through the injector orifice begins on or after 70 degrees before TDC and the injecting ends at or before 40 degrees before TDC.

Some examples include completing combustion in the main combustion chamber in less than 12 degrees of crank angle.

Another example is system for igniting a mixture in a main combustion chamber of an internal combustion engine, the system includes a carrier body adapted to couple to the internal combustion engine and includes a prechamber defines an open end configured to receive an igniter and a jet passage, the prechamber adapted to receive fuel from the main combustion chamber through the jet passage a fuel valve receptacle configured to receive a fuel valve and includes a fuel passageway. The tip end defines a jet aperture in fluid commination with the jet passage, and the jet aperture is configured to ingest a fuel-air mixture from the main combustion chamber during the compression stroke of the internal combustion engine and expel ignited gaseous fuel and air from the prechamber through the jet aperture and into the main combustion chamber as a flaming jet after ignition of the ingested fuel-air mixture by the igniter. The tip end also defines an injector orifice in fluid communication with the fuel passageway, the injector orifice is configured to inject fuel into the main combustion chamber from the fuel valve disposed in the fuel valve receptacle and in a trajectory that crosses the jet aperture.

In some examples, the prechamber is a passively fueled chamber having no fuel supply directly into the prechamber.

In some examples, the injector orifice includes a plurality of injector orifices includes a first subset oriented to direct fuel along converging trajectories, and a second subset oriented to direct fuel in a radial direction.

In some examples, the jet aperture includes an axial jet aperture oriented along a longitudinal axis of the plug body and where the tip end further defines a plurality of peripheral jet apertures oriented away from the longitudinal axis of the plug body, the peripheral jet apertures in fluid communication with the jet passage.

In some examples, the injector orifice is configured to create a fuel-rich zone in a surrounding the jet aperture, and where the jet aperture is configured to ingest a fuel-air mixture from the fuel-rich zone during a compression stroke of the engine.

Yet another example of the present system is a component of an internal combustion engine, the component includes a prechamber defines an open end configured to receive an igniter and a jet passage fluidly coupled to a main combustion chamber of the internal combustion engine, the prechamber adapted to receive fuel from the main combustion chamber through the jet passage. The component includes a fuel valve receptacle configured to receive a fuel valve and includes a fuel passageway, and a segment that defines a portion of the main combustion chamber. The segment includes a jet aperture in fluid commination with the jet passage, the jet aperture is configured to ingest a fuel-air mixture from the main combustion chamber during the compression stroke of the internal combustion engine and expel ignited gaseous fuel and air from the prechamber through the jet aperture and into the main combustion chamber as a flaming jet after ignition of the ingested fuel-air mixture by the igniter, and an injector orifice in fluid communication with the fuel passageway, the plurality of injector orifices are configured to inject fuel into the main combustion chamber from the fuel injector disposed in the fuel injector receptacle and in a trajectory that crosses the jet aperture.

In some examples, the prechamber is a passively fueled chamber that has no fuel supply directly into the prechamber.

In some examples, the injector orifice includes a plurality of injector orifices includes a first subset oriented to direct fuel along converging trajectories, and a second subset oriented to direct fuel in a radial direction.

In some examples, the jet aperture includes an axial jet aperture oriented along a longitudinal axis of the plug body and where the tip end further defines a plurality of peripheral jet apertures oriented away from the longitudinal axis of the plug body, the peripheral jet apertures in fluid communication with the jet passage.

In some examples, one or more of the plurality of injector orifices are configured to create a fuel-rich zone in a surrounding the jet aperture, and where the jet aperture is configured to ingest a fuel-air mixture from the fuel-rich zone during a compression stroke of the engine.

A number of implementations have been described. Nevertheless, it will be understood that various modifications may be made. Accordingly, other implementations are within the scope of the following claims.

What is claimed is:

1. A system for igniting a mixture in a main combustion chamber of an internal combustion engine, the system comprising:
 a carrier body adapted to couple to the internal combustion engine and comprising:
  a prechamber defining an open end configured to receive an igniter and a jet passage, the prechamber adapted to receive fuel from the main combustion chamber through the jet passage,
  a fuel valve receptacle configured to receive a fuel valve and comprising a fuel passageway, and
  a tip end defining:
   a jet aperture in fluid commination with the jet passage, the jet aperture being configured to ingest a fuel-air mixture from the main combustion chamber during the compression stroke of the internal combustion engine and expel ignited gaseous fuel and air from the prechamber through the jet aperture and into the main combustion chamber as a flaming jet after ignition of the ingested fuel-air mixture by the igniter, and
   an injector orifice in fluid communication with the fuel passageway, the injector orifice being configured to inject fuel into the main combustion chamber from the fuel valve disposed in the fuel valve receptacle and in a trajectory that crosses the jet aperture.

2. The system of claim 1, where the prechamber is a passively fueled chamber having no fuel supply directly into the prechamber.

3. The system of claim 1, where the injector orifice comprises a plurality of injector orifices including a first subset oriented to direct fuel along converging trajectories, and a second subset oriented to direct fuel in a radial direction.

4. The system of claim 1, where the jet aperture comprises an axial jet aperture oriented along a longitudinal axis of the plug body and where the tip end further defines a plurality of peripheral jet apertures oriented away from the longitudinal axis of the plug body, the peripheral jet apertures in fluid communication with the jet passage.

5. The system of claim 1, where the injector orifice is configured to create a fuel-rich zone in a surrounding the jet aperture, and where the jet aperture is configured to ingest a fuel-air mixture from the fuel-rich zone during a compression stroke of the engine.

6. A component of an internal combustion engine, the component comprising:
 a prechamber defining an open end configured to receive an igniter and a jet passage fluidly coupled to a main combustion chamber of the internal combustion engine, the prechamber adapted to receive fuel from the main combustion chamber through the jet passage,
 a fuel valve receptacle configured to receive a fuel valve and comprising a fuel passageway, and
 a segment defining a portion of the main combustion chamber, the segment including:
  a jet aperture in fluid commination with the jet passage, the jet aperture being configured to ingest a fuel-air mixture from the main combustion chamber during the compression stroke of the internal combustion engine and expel ignited gaseous fuel and air from the prechamber through the jet aperture and into the main combustion chamber as a flaming jet after ignition of the ingested fuel-air mixture by the igniter, and
  an injector orifice in fluid communication with the fuel passageway, the plurality of injector orifices being configured to inject fuel into the main combustion chamber from the fuel injector disposed in the fuel injector receptacle and in a trajectory that crosses the jet aperture.

7. The component of claim 6, where the prechamber is a passively fueled chamber having no fuel supply directly into the prechamber.

8. The component of claim 6, where the injector orifice comprises a plurality of injector orifices including a first subset oriented to direct fuel along converging trajectories, and a second subset oriented to direct fuel in a radial direction.

9. The component of claim 6, where the jet aperture comprises an axial jet aperture oriented along a longitudinal axis of the plug body and where the tip end further defines a plurality of peripheral jet apertures oriented away from the longitudinal axis of the plug body, the peripheral jet apertures in fluid communication with the jet passage.

10. The component of claim 6, where one or more of the plurality of injector orifices are configured to create a fuel-rich zone in a surrounding the jet aperture, and where the jet aperture is configured to ingest a fuel-air mixture from the fuel-rich zone during a compression stroke of the engine.

11. A method of combusting gaseous fuel in a main combustion chamber of an internal combustion engine, the method comprising:
 receiving gaseous fuel into the main combustion chamber through an injector orifice to mix with air in the main combustion chamber, the internal combustion engine comprising a prechamber having a jet aperture in fluid communication between an interior of the prechamber and the main combustion chamber, the gaseous fuel being received in the main combustion chamber in a trajectory that crosses the jet aperture;
 flowing, during compression of the main combustion chamber, mixed gaseous fuel and air into the prechamber though the jet aperture, the compression passively flowing the mixed gaseous fuel and air;
 igniting, in the prechamber, the mixed gaseous fuel and air ingested into the prechamber from the main combustion chamber; and
 expelling ignited gaseous fuel and air from the prechamber through the jet aperture and into the main combustion chamber as a flaming jet.

12. The method of claim 11, where a bleed port connects the main fuel injection passage to the prechamber enabling some leakage of fuel to simultaneously fuel the main combustion chamber and a portion of the prechamber.

13. The method of claim 11, where the injector orifice comprises a plurality of injector orifices including a first subset oriented to direct fuel in a converging trajectory, and a second subset oriented to direct fuel in a radial direction.

14. The method of claim 11, where injecting gaseous fuel into the internal combustion engine through the injector orifice to mix with air in the main combustion chamber comprises forming a cloud of gas surrounding the jet aperture and where the cloud of gas forms a fuel-rich gaseous mixture, where the compression passively flows the fuel-rich gaseous mixture into the prechamber.

15. The method of claim 11, where the jet aperture comprises an axial jet aperture oriented along a longitudinal axis and a plurality of peripheral jet apertures oriented away from the longitudinal axis.

16. The method of claim 11, where the prechamber is a passively fueled chamber having no fuel supply directly into the prechamber.

17. The method of claim 11, where injecting gaseous fuel into the internal combustion engine through the injector orifice comprises flowing the gaseous fuel across one or more serrations formed in the injector orifice.

18. The method of claim 11, where injecting gaseous fuel into the internal combustion engine through the injector orifice comprises injecting the fuel at a pressure between 30 and 100 bar.

19. The method of claim 11, where injecting gaseous fuel into the internal combustion engine through the injector orifice begins on or after 70 degrees before TDC and the injecting ends at or before 40 degrees before TDC.

20. The method of claim 11, further including completing combustion in the main combustion chamber in less than 12 degrees of crank angle.

\* \* \* \* \*

UNITED STATES PATENT AND TRADEMARK OFFICE
CERTIFICATE OF CORRECTION

PATENT NO.        : 9,890,690 B2
APPLICATION NO.   : 15/288734
DATED             : February 13, 2018
INVENTOR(S)       : Domenico Chiera and Gregory James Hampson It is certified that error appears in the above-identified patent and that said Letters Patent is hereby corrected as shown below:

In the Specification

Column 4, Line 52, delete "to to" and insert --to--.

Column 7, Line 63, after "106" insert --.--.

Column 9, Line 63, delete "crenelations" and insert --crenulations--.

Column 12, Line 1, delete "so" and insert --So--.

Column 14, Line 2, delete "commination" and insert --communication--.

Column 14, Line 42, delete "commination" and insert --communication--.

In the Claims

Column 15, Line 23, Claim 1, delete "commination" and insert --communication--.

Column 16, Line 1, Claim 6, delete "commination" and insert --communication--.

Signed and Sealed this
Seventh Day of April, 2020

Andrei Iancu
*Director of the United States Patent and Trademark Office*